(12) United States Patent
Satoh et al.

(10) Patent No.: US 6,995,630 B2
(45) Date of Patent: Feb. 7, 2006

(54) HIGH-FREQUENCY COMPOUND SWITCH MODULE AND COMMUNICATION TERMINAL USING IT

(75) Inventors: Yuki Satoh, Osaka (JP); Toshio Ishizaki, Hyogo (JP); Takeo Yasuho, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 150 days.

(21) Appl. No.: 10/471,230

(22) PCT Filed: Oct. 23, 2002

(86) PCT No.: PCT/JP02/10992

§ 371 (c)(1),
(2), (4) Date: Sep. 9, 2003

(87) PCT Pub. No.: WO03/036806

PCT Pub. Date: May 1, 2003

(65) Prior Publication Data

US 2004/0071111 A1    Apr. 15, 2004

(30) Foreign Application Priority Data

Oct. 24, 2001  (JP) ............................. 2001-326242
Dec. 10, 2001  (JP) ............................. 2001-375612

(51) Int. Cl.
*H03H 9/70* (2006.01)
*H03H 9/72* (2006.01)
(52) U.S. Cl. .................. 333/133; 333/101; 333/126; 333/129; 333/189; 455/83; 455/552
(58) Field of Classification Search ........ 333/187–196, 333/101, 126, 129, 132, 133; 455/83, 552
See application file for complete search history.

(56) References Cited

U.S. PATENT DOCUMENTS

| 5,815,052 | A | * | 9/1998 | Nakajima et al. ........... 333/175 |
| 6,442,376 | B1 | * | 8/2002 | Furutani et al. .............. 455/82 |
| 6,445,262 | B1 | * | 9/2002 | Tanaka et al. .............. 333/133 |
| 6,759,924 | B2 | * | 7/2004 | Sakuragawa et al. ....... 333/133 |
| 6,766,149 | B1 | * | 7/2004 | Hikita et al. .................. 455/83 |
| 6,867,662 | B2 | * | 3/2005 | Uriu et al. ................... 333/132 |

(Continued)

FOREIGN PATENT DOCUMENTS

JP         06-85712 A       3/1994

(Continued)

*Primary Examiner*—Barbara Summons
(74) *Attorney, Agent, or Firm*—McDermott Will & Emery LLP

(57) ABSTRACT

A high-frequency compound switch module of this invention has a first communication system comprising a switch unit for switching connection of a signal from an antenna to one of a transmission circuit and a reception circuit of the first communication system based on a signal from a control terminal, a filter provided on a first reception circuit side, for filtering out a first reception signal, and a first phase shift line provided between the filter and the switch unit, and a second communication system comprising a second phase shift line provided between the switch unit and the first phase shift line, and a branching filter provided in series to the second phase shift line for branching a signal from the second phase shift line into a second transmission signal and a second reception signal. The switch module is capable of performing at least a receiving process of the first communication system while performing transmission/reception with the second communication system.

26 Claims, 13 Drawing Sheets

U.S. PATENT DOCUMENTS

| | | | |
|---|---|---|---|
| 6,876,273 B2 * | 4/2005 | Harada et al. | 333/133 |
| 2002/0090974 A1 * | 7/2002 | Hagn | 455/552 |
| 2002/0137471 A1 * | 9/2002 | Satoh et al. | 455/83 |
| 2004/0266378 A1 * | 12/2004 | Fukamachi et al. | 455/188.1 |

FOREIGN PATENT DOCUMENTS

| | | |
|---|---|---|
| JP | 2000-165288 A | 6/2000 |
| JP | P2000-165274 A | 6/2000 |
| JP | P2001-44885 A | 2/2001 |
| JP | P2001-244844 A | 9/2001 |
| JP | P2001-267802 A | 9/2001 |
| WO | WO 00/55983 | 9/2000 |
| WO | WO 01/45285 * | 6/2001 |

* cited by examiner

US 6,995,630 B2

HIGH-FREQUENCY COMPOUND SWITCH MODULE AND COMMUNICATION TERMINAL USING IT

FIELD OF THE INVENTION

The present invention relates to a high-frequency compound switch module adaptable for use in a mobile communication device such as a handy phone and the like. The invention also relates to a communication terminal using the same.

BACKGROUND OF THE INVENTION

In recent years, communication devices like handy phones continue to advance their functions toward multi-band communications and combinations with new systems to secure a number of channels and to cope with introduction of new systems such as so-called third generation system and the like due to an upsurge in the number of subscribers in the individual mobile telephone systems. In addition, there is a growing demand for miniaturization and reduction of insertion losses on components used for the handy phones.

In GSM (i.e. Global System for Mobile Communications), which has come into widespread use from Europe to the world, there has been introduced a communication system using 900 MHz band and 1,800 MHz band, and dual-band communication terminals supporting this system are now available in the market. FIG. 11 shows a circuit block diagram of an antenna front-end section of a dual-band handy phone adapted to a combination of GSM (transmission in a range of 880 to 915 MHz and reception in a range of 925 to 960 MHz) and DCS (i.e. Digital Cellular System, for transmission in a range of 1,710 to 1,785 MHz and reception in a range of 1,805 to 1,880 MHz).

In FIG. 11, the antenna front-end section comprises antenna terminal 101, transmission terminals 102 and 103, reception terminals 104 and 105, diplexer 106 for combining and branching GSM transmission/reception signals and DCS transmission/reception signals, switches 107 and 108 for selection between transmission and reception of GSM and DCS services respectively, LPF's 109 and 110 for filtering off high harmonic components of transmission signal of GSM and DCS services respectively, BPF's 111 and 112 having passbands corresponding to the respective receiving frequency bands of GSM and DCS services, and control terminals 113 and 114 of the switches for selection of transmission and reception of the GSM and DCS services respectively.

Surface acoustic wave ("SAW") filter is an example of components used as BPF's 111 and 112. Switches 107 and 108 for selection between transmission and reception are SPDT (i.e. single-pole double-throw type) switches operable for selecting between transmission and reception in response to a voltage or the like impressed individually on control terminals 113 and 114.

In addition, transmission terminals 102 and 103 are connected externally to transmission circuits including transmission amplifiers 115 and 116, receiving side terminals 104 and 105 are connected externally to reception circuits including LNA's (i.e. low noise amplifiers) 117 and 118 respectively, and antenna terminal 101 is connected to an antenna outside, to constitute the communication device.

As W-CDMA (i.e. Wideband Code Division Multiple Access) employing CDMA (i.e. Code Division Multiple Access) method will be introduced in the forthcoming third generation, it is extremely important industrially to bring out compound terminals for both W-CDMA and GSM services in order to use the existing GSM infrastructure effectively. In this case, it is necessary for any such terminals to operate in a manner that it takes reception of GSM service while making communication with W-CDMA services, and it also takes reception of W-CDMA service while being in reception with GSM at the same time, in order to ensure compatibility with the existing systems.

However, based as it is on the above-discussed structure of the prior art, it is not possible to adapt it for the compound function with the forthcoming third generation systems.

DISCLOSURE OF THE INVENTION

The present invention provides a high-frequency compound switch module adaptable to at least two different communication systems, and the switch module includes a first communication system comprising a switch unit for switching connection of a signal from an antenna to one of a transmission circuit and a reception circuit of the first communication system based on a signal from a control terminal, a filter provided on the reception circuit side for filtering out a first reception signal, and a first phase shift line provided between the filter and the switch unit, and a second communication system comprising a second phase shift line provided between the switch unit and the first phase shift line, and a branching filter provided in series to the second phase shift line for branching a signal from the second phase shift line into a second transmission signal and a second reception signal. The high-frequency compound switch module has a feature that simultaneously enables the second communication system to process the second transmission and reception signals when the switch unit of the first communication system is turned to a first reception signal side.

DETAILED DESCRIPTION OF THE PREFERRED EMBODIMENTS

Figure 1A:
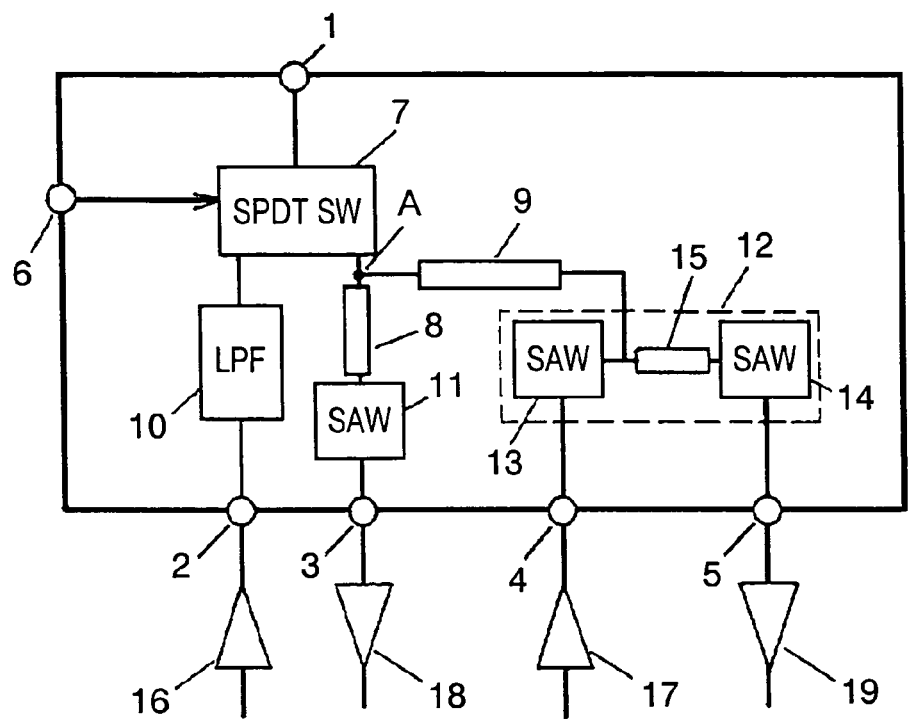
FIG. 1A is a circuit block diagram according to a first exemplary embodiment of the present invention.

Description is hereinafter provided individually of exemplary embodiments of this invention with reference to the accompanying drawings.

First Exemplary Embodiment

Referring to the drawings, description is now given of the first exemplary embodiment.

FIG. 1A is a circuit block diagram of a high-frequency compound switch module according to the first exemplary embodiment. In FIG. 1A, the high-frequency compound switch module comprises antenna terminal 1, transmission terminal 2 for a first system, reception terminal 3 for the first system, transmission terminal 4 for a second system, reception terminal 5 for the second system, control terminal 6, SPDT switch 7, first phase shift line 8, second phase shift line 9, low pass filter ("LPF") 10 for filtering out high harmonic components of a transmission signal in the first system, band pass filter 11 for passing a signal of receiving frequency band in the first system, and branching filter 12 for branching and combining transmission and reception signals of the second system.

In FIG. 1A, band pass filter 11 comprises surface acoustic wave ("SAW") filter, and branching filter 12 employs SAW filters 13 and 14 for both transmission side and reception side.

Third phase shift line 15 is used for impedance matching to achieve the function of branching and combining the transmission and reception signals of the second system. Transmission terminals 2 and 4 are connected externally to transmission circuits including transmission amplifiers 16 and 17, and receiving side terminals 3 and 5 are connected externally to reception circuits including LNA's (i.e. low noise amplifiers) 18 and 19.

Antenna terminal 1 is connected externally to an antenna to constitute a communication device.

SPDT switch 7 is controlled by a voltage applied to control terminal 6, to switch between transmission and reception modes in the first system, so as to make a connection of antenna terminal 1 to transmission terminal 2 in the transmission mode, or the connection of antenna terminal 1 to reception terminal 3 in the reception mode. SPDT switch 7 has first phase shift line 8 and SAW filter 11 connected to one side leading to reception terminal 3.

In addition, phase shift line 9 and branching filter 12 for branching and combining transmission and reception signals of the second system are connected to a splice between SPDT switch 7 and phase shift line 8, and branching filter 12 is then connected to transmission terminal 4 and reception terminal 5 as their respective external terminals.

The first exemplary embodiment can be applied to a communication system, which uses TDMA (Time Division Multiple Access) as the first system, and CDMA or FDMA (Frequency Division Multiple Access) as the second system.

In consideration of frequency allocations for any communication system, a transmission frequency band and a reception frequency band are set relatively close to each other in general, with a difference of approximately 5% between their center frequencies. In the communication system of the first exemplary embodiment, however, separation of frequencies is quite large between different systems as compared to the above, as individual systems are served in the widely spaced frequency bands.

Therefore, SAW filter 11 of the first communication system in this exemplary embodiment has a passing characteristic with an attenuation band lying in a region of the transmission and reception frequencies of the second communication system. At these frequencies, SAW filter 11 thus shows a small value in real part (i.e. resistive component) of input impedance, which can be plotted in a region near a circle of real part=0 in the Smith chart, and a reflection coefficient close to magnitude 1 in absolute value.

On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from point A shown in FIG. 1A toward reception terminal 3 through first phase shift line 8, and second phase shift line 9 in a manner to provide a sufficiently large (open-circuit) impedance in the frequencies of the first communication system when observed from the same point A toward transmission terminal 4 and reception terminal 5 through second phase shift line 9, thereby making it operable in a combination of the two different first and second communication systems.

In other words, adoption of the above structure makes it possible to receive a pilot signal transmitted from a base station of the first communication system and to control the communication device appropriately even when communication is being made with the second communication system, since a desired control signal can be input to control terminal 6 to control SPDT switch 7 in a manner to make a connection between antenna terminal 1 and reception terminal 3 simultaneously for the signal received in the first communication system even in the midst of communication with the second communication system.

The first exemplary embodiment can be applied to a compound terminal that uses a combination of, for instance, GSM 900 (transmission frequency of the terminal in a range of 880 to 915 MHz and receiving frequency in a range of 925 to 960 MHz), and W-CDMA (transmission frequency in a range of 1,920 to 1,980 MHz and receiving frequency in a range of 2,110 to 2,170 MHz).

Figure 1B:
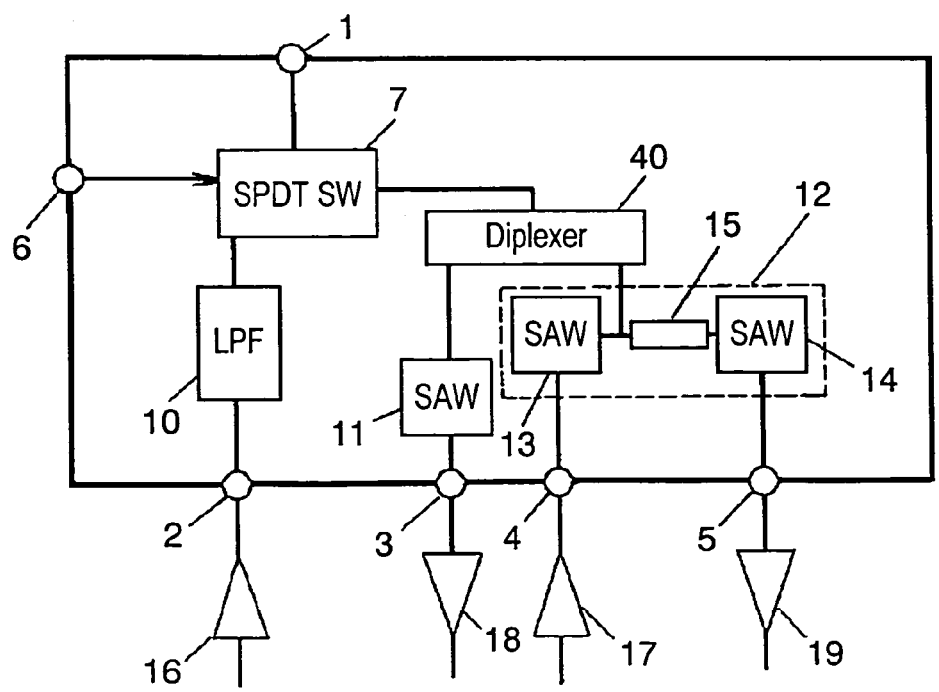
FIG. 1B is another circuit block diagram according to the first exemplary embodiment of the invention.

Although what has been discussed in this first exemplary embodiment is an example equipped with phase shift lines 8 and 9, they may be replaced with diplexer 40 as shown in FIG. 1B. Use of diplexer 40 can provide more stable performance because it is not dependent on input impedance characteristics of SAW filter 11 and branching filter 12.

Figure 1C:
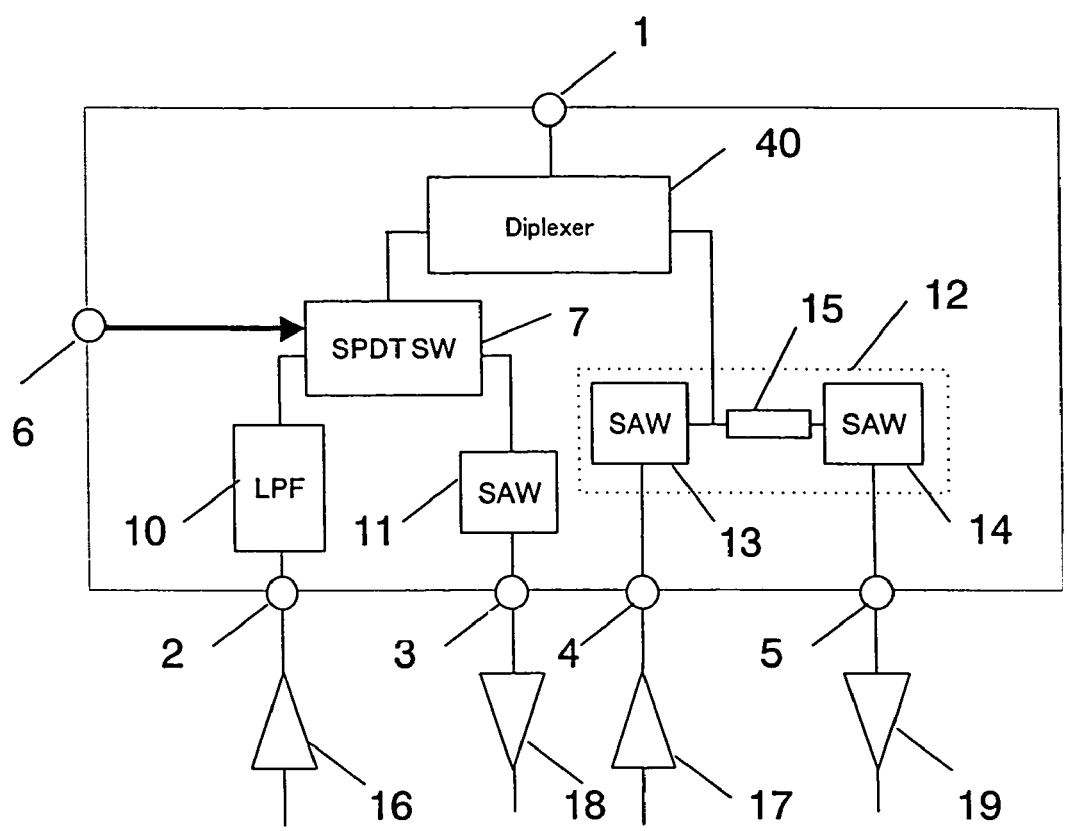
FIG. 1C is still another circuit block diagram according to the first exemplary embodiment of the invention.

Furthermore, as a modified structure of the first exemplary embodiment, diplexer 40 may be connected to antenna terminal 1, as shown in FIG. 1C. This structure can also provide more stable performance since operation of diplexer 40 is not dependent on the input impedance characteristics of SAW filter 11 and branching filter 12. In addition, this structure can reduce a transmission loss of the second communication system because a signal passage of the second communication system does not include SPDT switch 7, in contrast to those of FIG. 1A and FIG. 1B. Because SPDT switch 7 has a transmission loss of approximately 0.5 dB, the loss can be reduced by a magnitude of this amount.

Moreover, the module may be so constructed as not to include SAW filter 11 and branching filter 12 in the circuit structures shown in FIG. 1B and FIG. 1C.

Second Exemplary Embodiment

Referring now to FIG. 2, description is provided of the second exemplary embodiment of this invention.

Figure 2A:
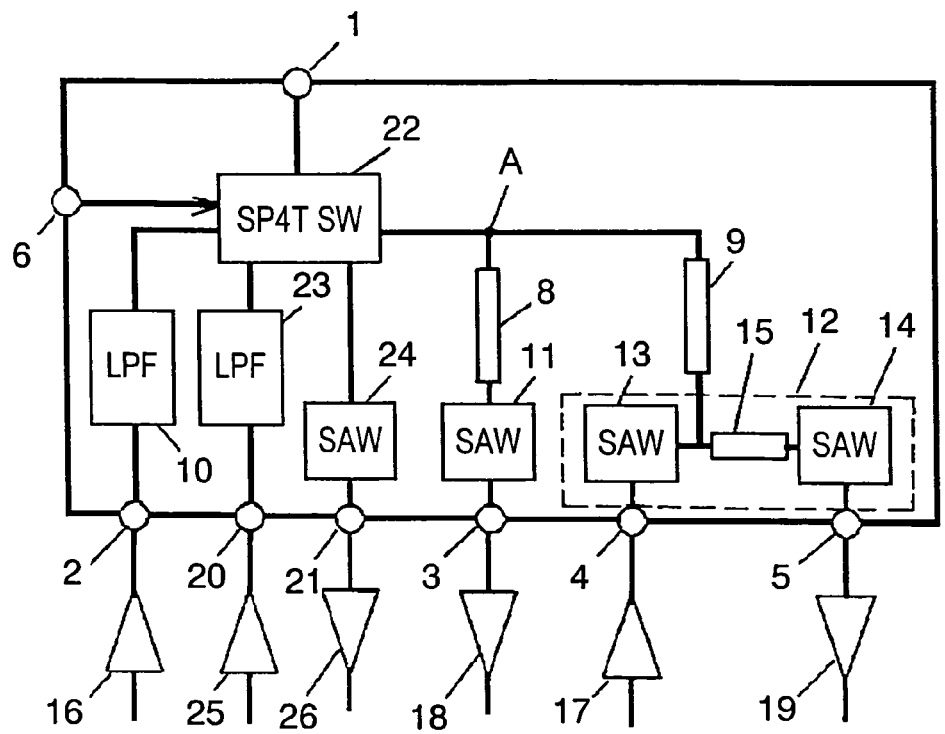
FIG. 2A is a circuit block diagram according to a second exemplary embodiment of the invention.

FIG. 2A is a circuit block diagram of a high-frequency compound switch module according to the second exemplary embodiment. Description will be skipped of any parts of the structure in FIG. 2A that are analogous to the first exemplary embodiment.

The high-frequency compound switch module comprises transmission terminal 20 in a third communication system, reception terminal 21 in the third communication system, SP4T (single-pole quadruple-throw type) switch 22 for switching connection of antenna terminal 1 to individual branches by means of control terminal 6, low pass filter ("LPF") 23 for filtering out higher harmonic components of a transmission signal in the third system, and band pass filter 24 for passing a signal of receiving frequency band in the third system. Transmission terminal 20 and reception terminal 21 are connected externally to transmission circuits including transmission amplifier 25 and reception circuits including LNA 26 respectively in the like manner as the first exemplary embodiment, to constitute a communication device adoptable for three communication systems.

In FIG. 2A, band pass filters 11 and 24 comprise surface acoustic wave ("SAW") filters.

Branching filter 12 employs SAW filters 13 and 14 for both of a transmission side and a reception side, and it uses third phase shift line 15 for impedance matching to achieve the function of branching and combining transmission and reception signals of a second communication system.

SP4T switch 22 is controlled by a voltage applied to control terminal 6, to switch the connection of antenna terminal 1 to any of transmission terminal 2, transmission terminal 20, reception terminal 3 and reception terminal 21 by making selection of any of transmission and reception modes in the first communication system, and transmission and reception modes in the third communication system.

First phase shift line 8 and SAW filter 11 are connected between SP4T switch 22 and reception terminal 3.

Second phase shift line 9 is connected between SP4T switch 22 and first phase shift line 8, and: this second phase shift line 9 is in series connection to branching filter 12 for branching and combining transmission and reception signals of the second communication system, which is then connected to transmission terminal 4 and reception terminal 5 as their respective external terminals.

The second exemplary embodiment can be applied to a system, which uses TDMA method as the first and the third communication systems, and CDMA or FDMA as the second communication system.

In consideration of frequency allocations for any of the communication systems, a transmission frequency band and a reception frequency band are set relatively close to each other in general, with a difference of approximately 5% between their center frequencies. In the communication system of the second exemplary embodiment, however, separation of frequencies is quite large between different systems as compared to the above, since individual systems are served in the widely spaced frequency bands.

Therefore, SAW filter 11 of the first communication system in the second exemplary embodiment has a passing characteristic with an attenuation band lying in a region of the transmission and reception frequencies of the second communication system. It thus shows a small value in real part (i.e. resistive component) of input impedance at these frequencies, which can be plotted in a region near a circle of real part=0 in the Smith chart, and a reflection coefficient close to magnitude 1 in absolute value. On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from point A shown in FIG. 2A toward reception terminal 3 through first phase shift line 8, and second phase shift line 9 in a manner to provide a sufficiently large (open-circuit) impedance in the frequencies of the first communication system when observed from the same point A toward transmission terminal 4 and reception terminal 5 through second phase shift line 9, thereby making it operable in a combination of the two different first and second communication systems.

In other words, adoption of the above structure makes it possible to receive a pilot signal transmitted from a base station of the first communication system and to control the communication device appropriately even when communication is being made with the second communication system, since a required control signal can be input to control terminal 6 to control SP4T switch 22 in a manner to make a connection between antenna terminal 1 and reception terminal 3 simultaneously for the signal received in the first communication system even in the midst of communication with the second communication system.

The second exemplary embodiment can be applied to a compound terminal that uses a combination of, for instance, GSM 900 (transmission frequency of the terminal in a range of 880 to 915 MHz, and receiving frequency in a range of 925 to 960 MHz) as the first communication system, W-CDMA (transmission frequency in a range of 1,920 to 1,980 MHz, and receiving frequency in a range of 2,110 to 2,170 MHz) as the second communication system, and DCS (transmission frequency in a range of 1,710 to 1,785 MHz and receiving frequency in a range of 1,805 to 1,880 MHz) as the third communication system. In the communication system of this application, although the communication frequencies are comparatively close to each other especially between the second communication system and the third communication system, use of SP4T switch 22 can achieve separation of the signals easily without increasing the transmission loss.

Figure 2B:
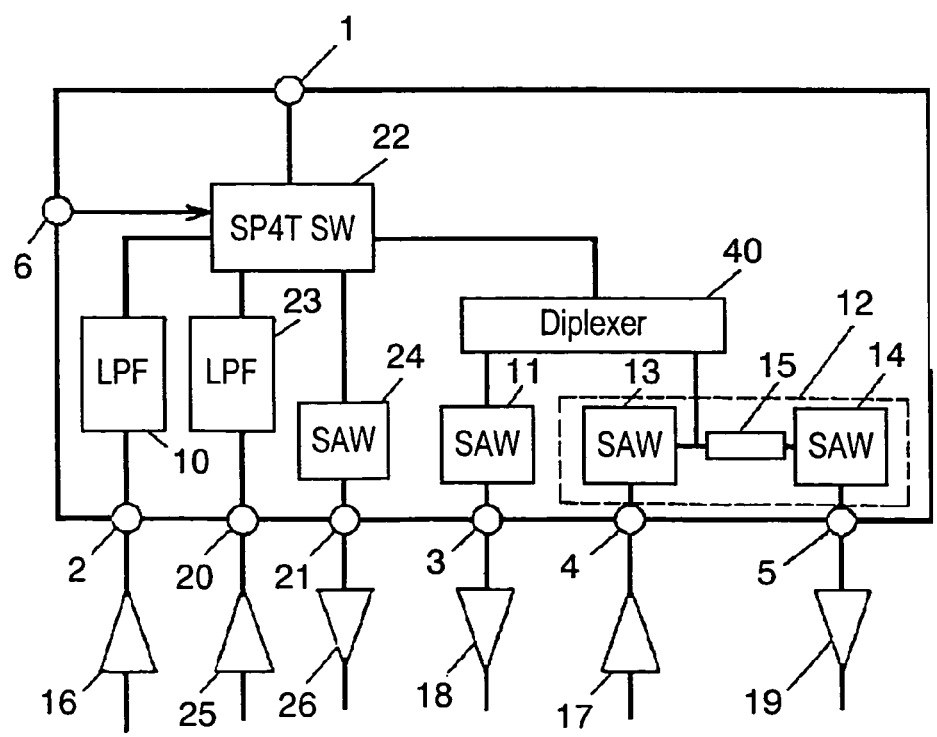
FIG. 2B is another circuit block diagram according to the second exemplary embodiment of the invention.

Although what has been discussed in the second exemplary embodiment is an example equipped with phase shift lines 8 and 9, they may be replaced with diplexer 40 as shown in FIG. 2B. Use of diplexer 40 can provide stable performance because it is not dependent on input impedance characteristics of SAW filter 11 and branching filter 12.

Figure 2C:
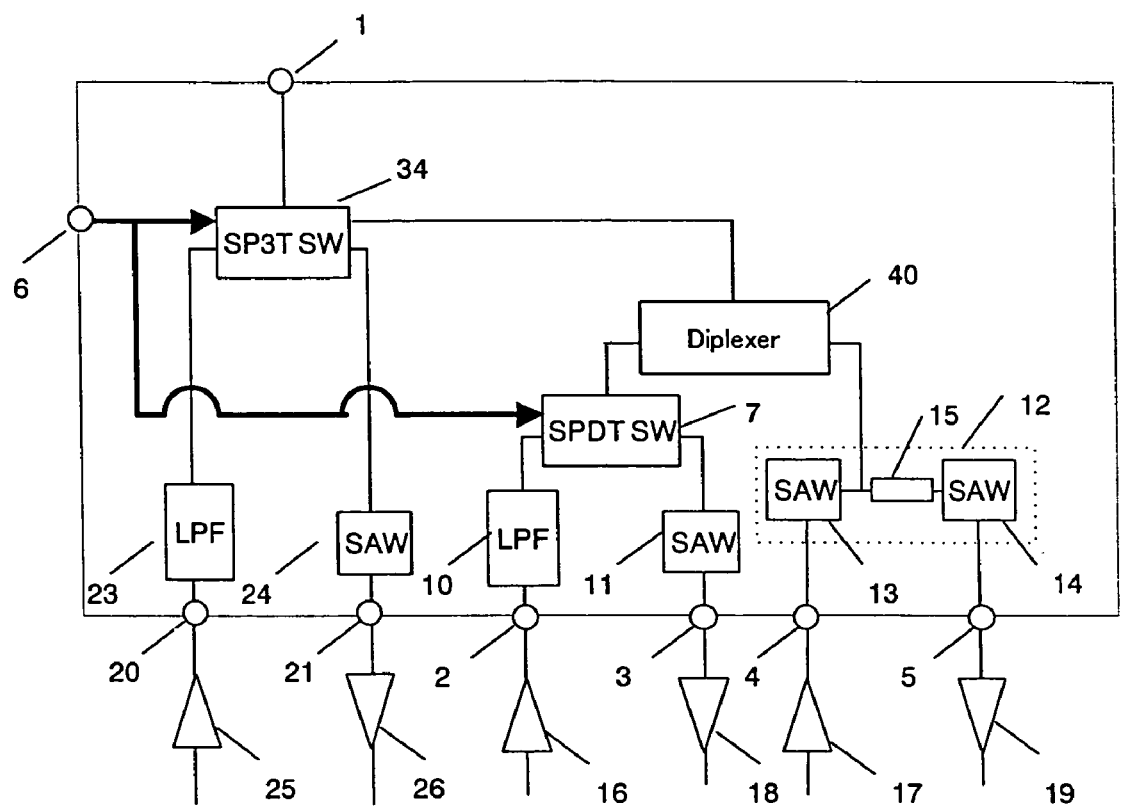
FIG. 2C is still another circuit block diagram according to the second exemplary embodiment of the invention.

In addition, as a modified structure of the second exemplary embodiment, the module may be composed with SP3T switch 34 in place of SP4T switch 22, with the addition of diplexer 40 connected to SP3T switch 34 as shown in FIG. 2C. This structure can provide more stable performance since operation of diplexer 40 is not dependent on the input impedance characteristics of SAW filter 11 and branching filter 12. This structure also allows use of more simplified switch as compared to the structures of FIG. 2A and FIG. 2B. In other words, the SP4T switch can be replaced with the SP3T switch to simplify the switching circuit. When the SP3T switch is composed of GaAs-IC, for instance, it can reduce a size of the chip, lower the transmission loss, and reduced the cost while realizing downsizing of the module, since it decreases a number of ports of the IC to be tested before the shipment.

Moreover, this module may be so constructed as not to include SAW filter 11 and branching filter 12 in the circuit structures shown in FIG. 2B and FIG. 2C.

Third Exemplary Embodiment

The third exemplary embodiment is described hereinafter with reference to the drawings.

Figure 3A:
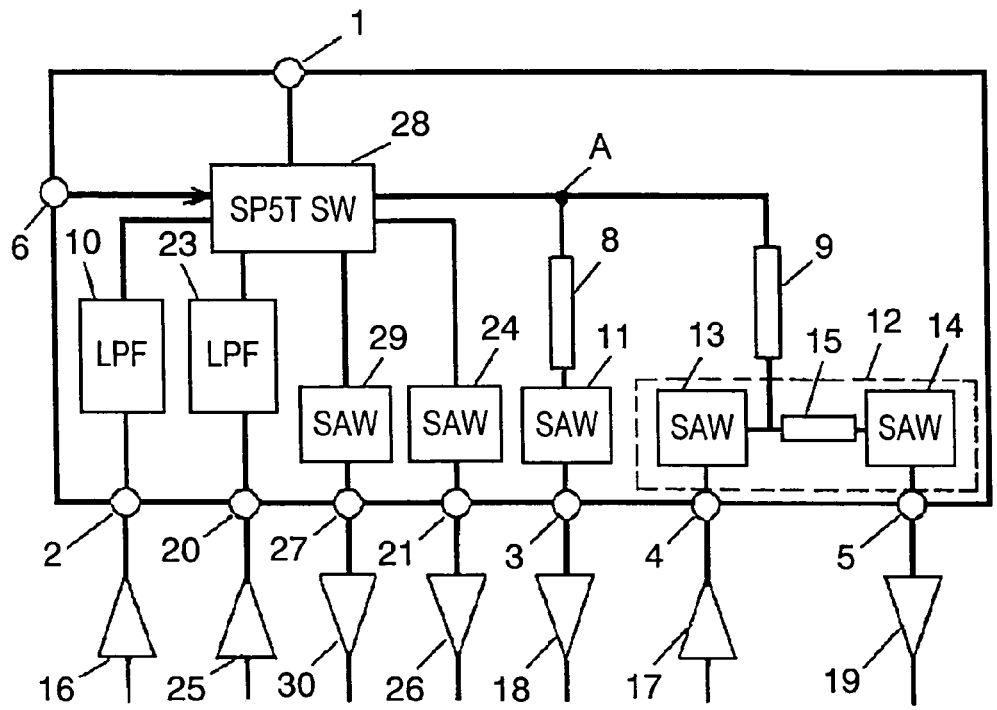
FIG. 3A is a circuit block diagram according to a third exemplary embodiment of the invention.

FIG. 3A is a circuit block diagram of a high-frequency compound switch module according to the third exemplary embodiment.

Description will be skipped of any parts of the structure in FIG. 3A that are analogous to the first and the second exemplary embodiments.

The high-frequency compound switch module comprises transmission terminal 20 common to a third and a fourth communication systems, LPF 23 for filtering out higher harmonic components contained in a third and a fourth transmission signals, reception terminal 27 in the fourth communication system, SP5T (i.e. single-pole quintuple-throw type) switch 28 for switching connection of antenna terminal 1 to individual branches by means of control terminal 6, and band pass filter 29 for passing a signal of receiving frequency band of the fourth communication system. Transmission terminal 20 and reception terminal 27 are connected externally to transmission amplifier 25 and LNA 30 respectively in the like manner as the second exemplary embodiment, to constitute a communication device adoptable for the four communication systems.

When surface acoustic wave ("SAW") filters are used for band pass filters 11, 24 and 29 in FIG. 3A, branching filter 12 is also provided with SAW filters 13 and 14 for both the transmission side and the reception side, in addition to third phase shift line 15 for impedance matching, to accomplish the function of branching and combining transmission and reception signals of the second communication system.

SP5T switch 28 is controlled by a voltage applied to control terminal 6 to switch the connection of antenna terminal 1 to any of transmission terminal 2, transmission terminal 20, reception terminal 3, reception terminal 21 and reception terminal 27, so as to make a selection of any of transmission and reception modes in the first communication system, transmission and reception modes in the third communication system, and transmission and reception modes in the fourth communication system.

First phase shift line 8 and SAW filter 11 are connected between SP5T switch 28 and reception terminal 3. Second phase shift line 9 is connected between SP5T switch. 28 and reception terminal 5. Second phase shift line 9 is connected in series to branching filter 12 for branching and combining transmission and reception signals of the second communication system, which is then connected to transmission terminal 4 and reception terminal 5 as their respective external terminals.

The third exemplary embodiment can be applied to a system, which uses TDMA method as the first, third, and fourth communication systems, and CDMA or FDMA as the second communication system.

In consideration of frequency allocations for any of the communication systems, a transmission frequency band and a reception frequency band are set relatively close to each other in general, with a difference of approximately 5% between their center frequencies. In the communication system discussed in the third exemplary embodiment, however, separation of frequencies is quite large between different systems as compared to the above, since individual systems are served in the widely spaced frequency bands.

Therefore, SAW filter 11 of the first communication system in the third exemplary embodiment has a passing characteristic with an attenuation band lying in a region of the transmission and reception frequencies of the second communication system. It thus shows a small value in real part (i.e. resistive component) of input impedance at these frequencies, which can be plotted in a region near a circle of real part=0 in the Smith chart, and a reflection coefficient close to magnitude 1 in absolute value.

On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the. Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from point A shown in FIG. 3A toward reception terminal 3 through first phase shift line 8, and second phase shift line 9 in a manner to provide a sufficiently large (open-circuit) impedance in the frequencies of the first communication system when observed from the same point A toward transmission terminal 4 and reception terminal 5 through second phase shift line 9, thereby making it operable in the combination of the two different first and second communication systems.

Adoption of the above structure makes it possible to receive a pilot signal transmitted from a base station of the first communication system and to control the communication device appropriately even when communication is being made with the second communication system, since a desired control signal can be input to control terminal 6 to control SP5T switch 28 in a manner to make a connection between antenna terminal 1 and reception terminal 3 simultaneously for the signal received in the first communication system even in the midst of communication with the second communication system.

The third exemplary embodiment can be applied to a compound terminal that uses a combination of, for instance, GSM 900 (transmission frequency of the terminal in a range of 880 to 915 MHz, and receiving frequency in a range of 925 to 960 MHz) as the first communication system, W-CDMA (transmission frequency in a range of 1,920 to 1,980 MHz, and receiving frequency in a range of 2,110 to 2,170 MHz) as the second communication system, DCS (transmission frequency in a range of 1,710 to 1,785 MHz and receiving frequency in a range of 1,805 to 1,880 MHz) as the third communication system, and GSM service in the United States which uses the PCS frequency band (transmission frequency in a range of 1,850 to 1,910 MHz and receiving frequency in a range of 1,930 to 1,990 MHz) as the fourth communication system. In the communication system of the above application, although the communication frequencies are comparatively close to one another especially among the second, the third and the fourth communication systems, use of SP5T switch 28 can achieve separation of the signals easily without increasing the transmission loss.

Figure 3B:
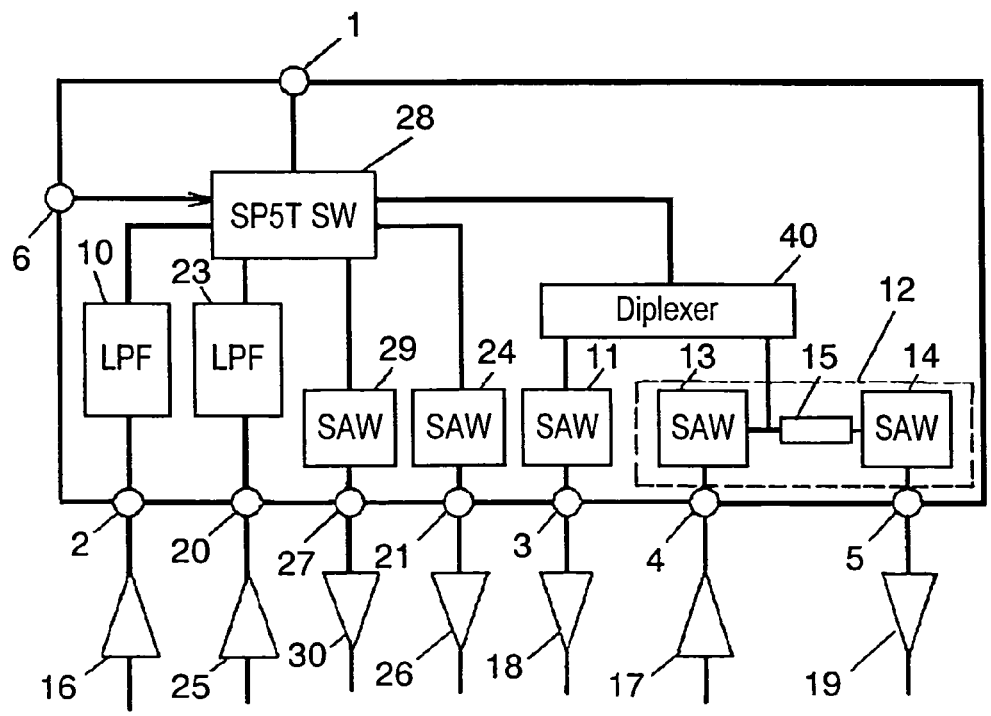
FIG. 3B is another circuit block diagram according to the third exemplary embodiment of the invention.

Although what has been discussed in the third exemplary embodiment is an example having phase shift lines 8 and 9, they may be replaced with diplexer 40 as shown in FIG. 3B. Use of diplexer 40 can provide stable performance because it is not dependent upon input impedance characteristics of SAW filter 11 and branching filter 12.

Figure 3C:
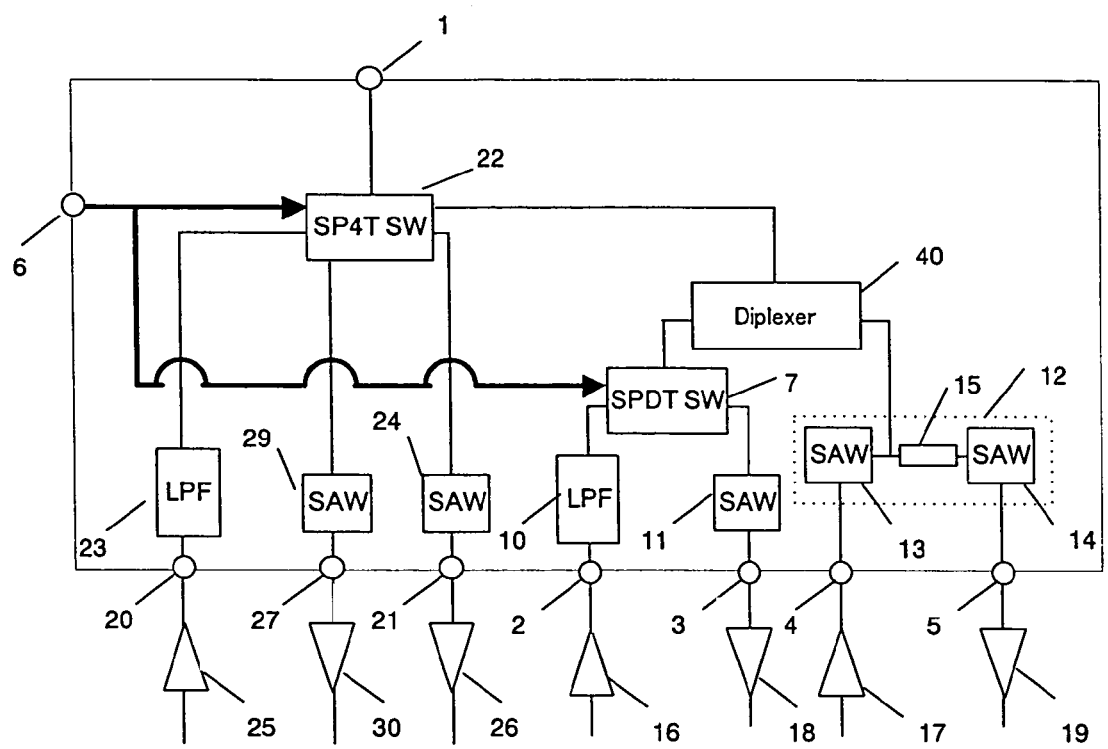
FIG. 3C is still another circuit block diagram according to the third exemplary embodiment of the invention.

In addition, as a modified structure of the third exemplary embodiment, the module may be composed with SP4T switch 22 in place of SP5T switch 28, with the addition of diplexer 40 connected to SP4T switch 22 as shown in FIG. 3C. This structure can provide more stable performance since operation of diplexer 40 is not dependent on the input impedance characteristics of SAW filter 11 and branching filter 12. This structure also allows use of rather simplified switch as compared to the structures of FIG. 3A and FIG. 3B. In other words, the SP5T switch can be replaced with the SP4T switch to simplify the switching circuit. When the switch is composed of GaAs-IC, for instance, it can reduce a size of the chip, lower the transmission loss, and reduced the cost while realizing downsizing of the module, since it decreases a number of ports of the IC to be tested before the shipment.

Moreover, this module may be so constructed as not to include SAW filter 11 and branching filter 12 in the circuit structures shown in FIG. 3B and FIG. 3C.

Fourth Exemplary Embodiment

Description is provided hereinafter of the fourth exemplary embodiment with reference to FIG. 4.

Figure 4:
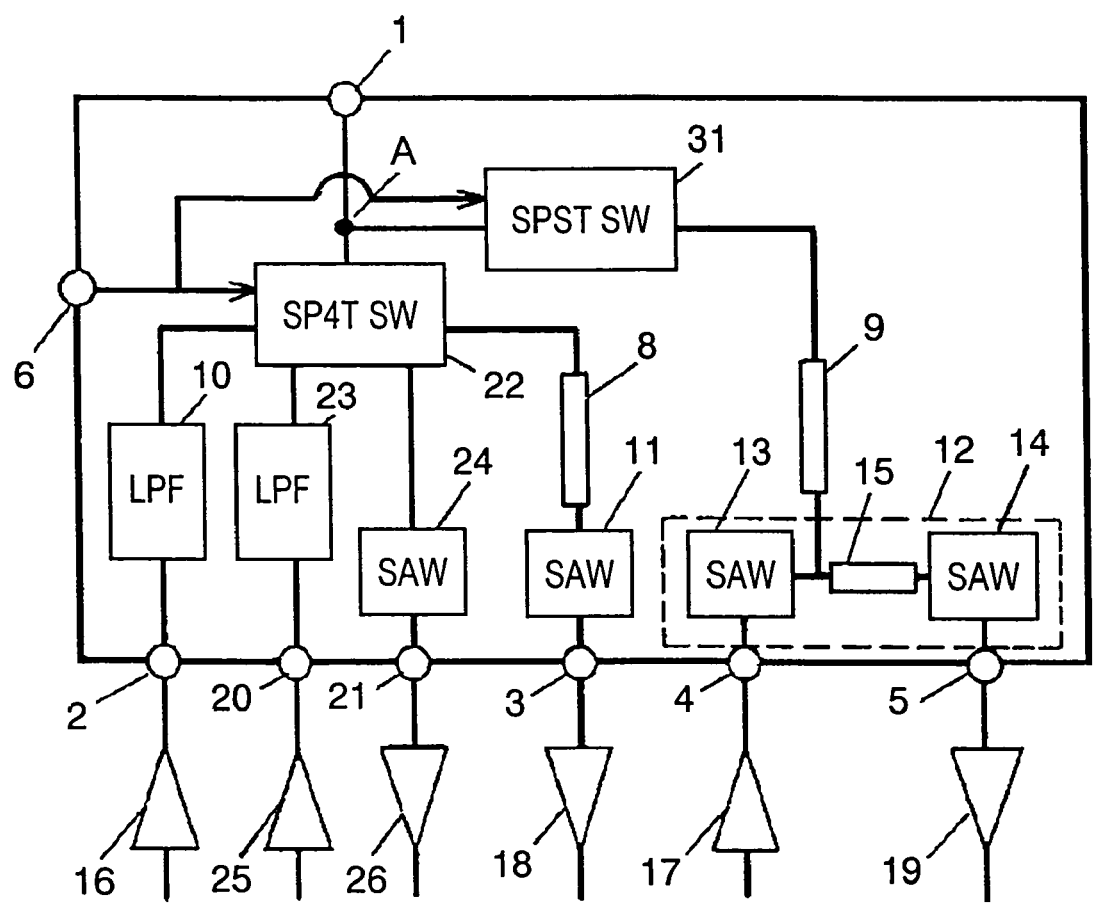
FIG. 4 is a circuit block diagram according to a fourth exemplary embodiment of the invention.

FIG. 4 is a circuit block diagram of a high-frequency compound switch module according to the fourth exemplary embodiment.

Description will be skipped of any parts of the structure in FIG. 4 that are analogous to the first through the third exemplary embodiments.

SPST (single-pole single-throw type) switch 31 is connected to antenna terminal 1 in parallel with SP4T switch 22 to turn on/off a second communication system.

The fourth exemplary embodiment represents a high-frequency compound switch module adaptable to three communication systems similar to that of the second exemplary embodiment.

In FIG. 4, band pass filters 11 and 24 comprise surface acoustic wave ("SAW") filters, and branching filter 12 employs SAW filters 13 and 14 for both of a transmission side and a reception side, and third phase shift line 15 for impedance matching, to achieve the function of branching and combining transmission and reception signals of the second communication system.

SP4T switch 22 and SPST switch 31 are controlled individually by a voltage applied to control terminal 6, for selection between transmission and reception modes in the first communication system, between transmission and reception modes in the third communication system, and switching on/off of a connection in the second communication system.

SP4T switch 22 operates in a manner to make connection of antenna terminal 1 to any of transmission terminal 2, transmission terminal 20, reception terminal 3 and reception terminal 21. SP4T switch 22 has first phase shift line 8 and SAW filter 11 connected to one side leading to reception terminal 3.

SPST switch 31 has branching filter 12 connected at one side for branching and combining transmission and reception signals of the second communication system, which is then connected to transmission terminal 4 and reception terminal 5 as their respective external terminals.

Thus, the fourth exemplary embodiment can be applied to a communication system, which uses TDMA method as the first and third communication systems, and CDMA or FDMA as the second communication system.

In consideration of frequency allocations for any of the communication systems, a transmission frequency band and a reception frequency band are set relatively close to each other in general, with a difference of approximately 5% between their center frequencies. In the communication system discussed in the fourth exemplary embodiment, however, separation of frequencies is quite large between different systems as compared to the above, since individual systems are served in the widely spaced frequency bands.

Therefore, SAW filter 11 of the first communication system in the fourth exemplary embodiment has a passing characteristic with an attenuation band lying in a region of the transmission and reception frequencies of the second communication system. It thus shows a small value in real part (i.e. resistive component) of input impedance at these frequencies, which can be plotted in a region near a circle of real part=0 in the Smith chart, and a reflection coefficient close to magnitude 1 in absolute value. On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from point A shown in FIG. 4 toward reception terminal 3 through SP4T switch 22 and first phase shift line 8, and second phase shift line 9 in a manner to provide a sufficiently large (open-circuit) impedance in the frequencies of the first communication system when observed from the same point A toward transmission terminal 4 and reception terminal 5 through SPST switch 31 and second phase shift line 9, thereby making it operable in the combination of the two different first and second communication systems.

In other words, adoption of the above structure makes it possible to receive a pilot signal transmitted from a base station of the first communication system and to control the communication device appropriately even when communication is being made with the second communication system, since a required control signal can be input to control terminal 6 to control SP4T switch 22 and SPST switch 31 in a manner to make a connection between antenna terminal 1 and reception terminal 3 simultaneously for the signal received in the first communication system even in the midst of communication with the second communication system.

The fourth exemplary embodiment can be applied to a compound terminal that uses a combination of, for instance, GSM 900 (transmission frequency of the terminal in a range of 880 to 915 MHz, and receiving frequency in a range of 925 to 960 MHz) as the first communication system, W-CDMA (transmission frequency in a range of 1,920 to 1,980 MHz, and receiving frequency in a range of 2,110 to 2,170 MHz) as the second communication system, and DCS (transmission frequency in a range of 1,710 to 1,785 MHz and receiving frequency in a range of 1,805 to 1,880 MHz) as the third communication system. In the communication system of this application, although the communication frequencies are comparatively close to each other especially between the second communication system and the third communication system, use of SPST switch 31 can achieve separation of the signals easily without increasing the transmission loss.

Fifth Exemplary Embodiment

Description is provided hereinafter of the fifth exemplary embodiment with reference to FIG. 5.

Figure 5:
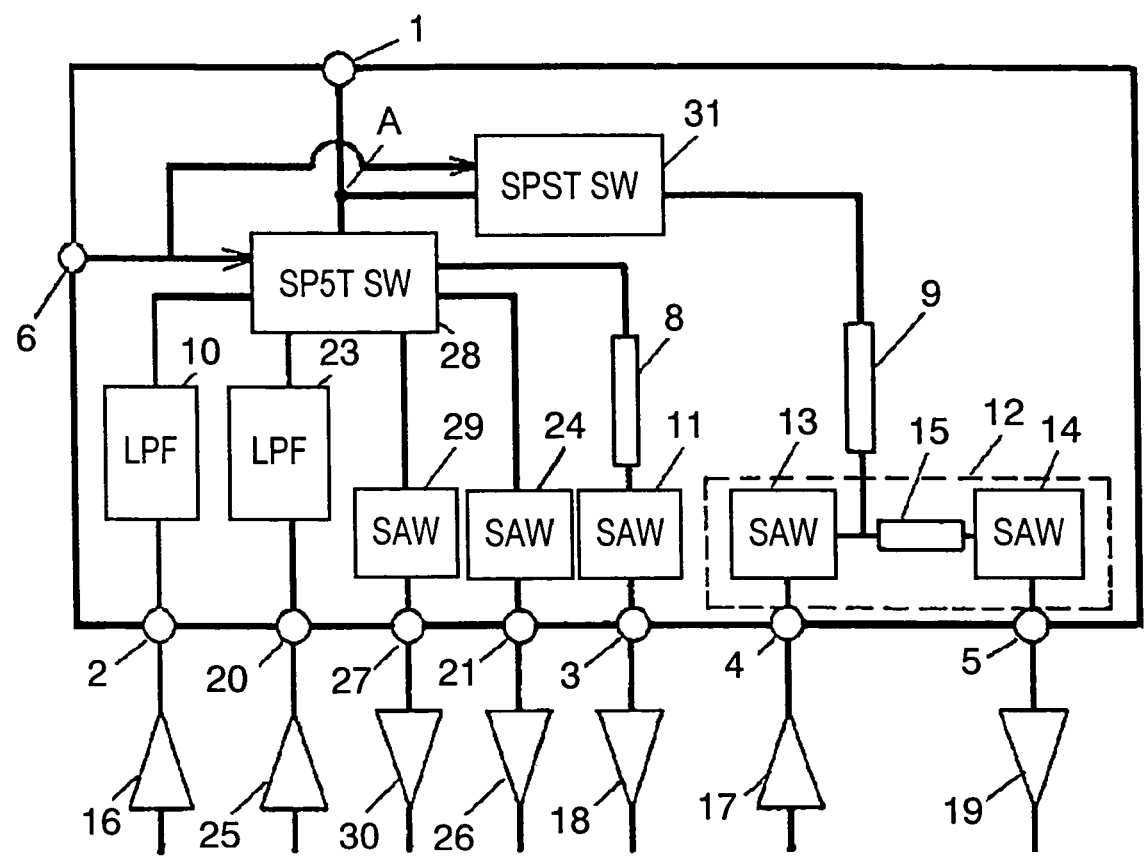
FIG. 5 is a circuit block diagram according exemplary embodiment of the invention.

FIG. 5 is a circuit block diagram of a high-frequency compound switch module according to the fifth exemplary embodiment.

Description will be skipped of any parts of the structure in FIG. 5 that are analogous to the first through the fourth exemplary embodiments.

This exemplary embodiment composes a communication device adaptable to four communication systems in all, as similar to that of the third exemplary embodiment.

In FIG. 5, band pass filters 11, 24 and 29 comprise surface acoustic wave ("SAW") filters.

Branching filter 12 employs SAW filters 13 and 14 for both of a transmission side and a reception side, and third phase shift line 15 for impedance matching, to achieve the function of branching and combining transmission and reception signals of the second communication system.

SP5T switch 28 and SPST switch 31 are controlled by a voltage applied to control terminal 6, for selection between transmission and reception modes in the first communication system, between transmission and reception modes in the third communication system, between transmission and reception modes in the fourth communication system, and switching on/off of a connection in the second communication system. SP5T switch 28 operates in a manner to make connection of antenna terminal 1 to any of transmission terminal 2, transmission terminal 20, reception terminal 3, reception terminal 21 and reception terminal 27.

First phase shift line 8 and SAW filter 11 are connected between SP5T switch 28 and reception terminal 3. Second phase shift line 9 and branching filter 12 for branching and combining transmission and reception signals of the second communication system are connected to SPST switch. 31, and branching filter 12 is lead to transmission terminal 4 and reception terminal 5 as their respective external terminals.

In the fifth exemplary embodiment, the module can be applied to a communication system, which uses TDMA method as the first, the third and the fourth communication systems, and CDMA or, FDMA as the second communication system.

In consideration of frequency allocations for any of the communication systems, a transmission frequency band and a reception frequency band are set relatively close to each other in general, with a difference of approximately 5% between their center frequencies. In the communication system discussed in the fifth exemplary embodiment, however, separation of frequencies is quite large between different systems as compared to the above, since individual systems are served in the widely spaced frequency bands.

Therefore, SAW filter 11 of the first communication system in the fifth exemplary embodiment has a passing characteristic with an attenuation band lying in a region of the transmission and reception frequencies of the second communication system. It thus shows a small value in real part (i.e. resistive component) of input impedance at these frequencies, which can be plotted in a region near a circle of real part=0 in the Smith chart, and a reflection coefficient close to magnitude 1 in absolute value.

On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from point A shown in FIG. 5 toward reception terminal 3 through SP5T switch 28 and first phase shift line 8, and second phase shift line 9 in a manner to provide a sufficiently large (open-circuit) impedance in the frequencies of the first communication system when observed from the same point A toward transmission terminal 4 and reception terminal 5 through SPST switch 31 and second phase shift line 9, thereby making it operable in the combination of the two different first and second communication systems.

In other words, adoption of the above structure makes it possible to receive a pilot signal transmitted from a base station of the first communication system and to control the communication device appropriately even when communication is being made with the second communication system, since a required control signal can be input to control terminal 6 to control SP5T switch 28 and SPST switch 31 in a manner to make a connection between antenna terminal 1 and reception terminal 3 simultaneously for the signal received in the first communication system even in the midst of communication with the second communication system.

The fifth exemplary embodiment can be applied to a compound terminal that uses a combination of, for instance, GSM 900 (transmission frequency of the terminal in a range of 880 to 915 MHz, and receiving frequency in a range of 925 to 960 MHz) as the first communication system, W-CDMA (transmission frequency in a range of 1,920 to 1,980 MHz, and receiving frequency in a range of 2,110 to 2,170 MHz) as the second communication system, DCS (transmission frequency in a range of 1,710 to 1,785 MHz and receiving frequency in a range of 1,805 to 1,880 MHz) as the third communication system, and GSM service in the United States which uses the PCS frequency band (transmission frequency in a range of 1,850 to 1,910 MHz and receiving frequency in a range of 1,930 to 1,990 MHz) as the fourth communication system. In the communication system of the above application, although the communication frequencies are comparatively close to one another especially among the second, the third and the fourth communication systems, use of SPST switch 31 can achieve separation of the signals easily without increasing the transmission loss.

Sixth Exemplary Embodiment

Description is provided hereinafter of the sixth exemplary embodiment with reference to FIG. 6.

Figure 6:
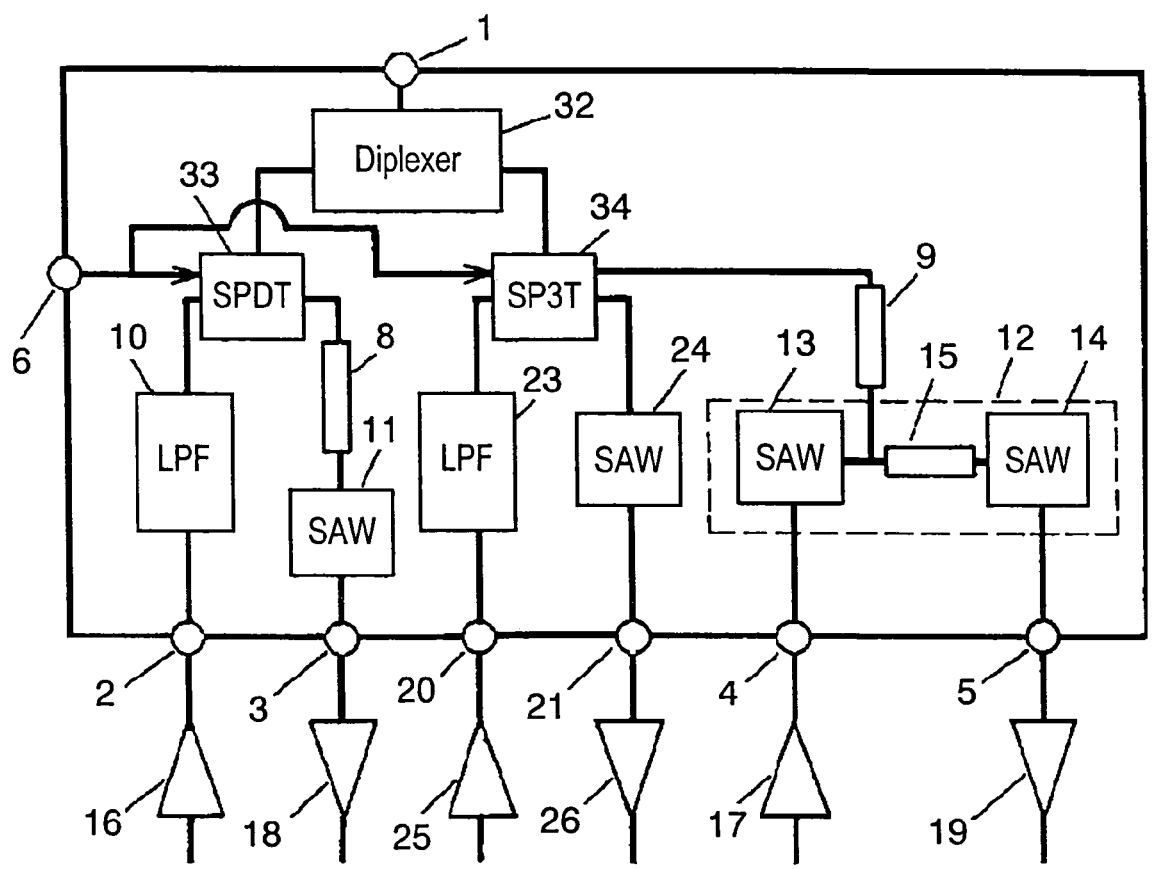
FIG. 6 is a circuit block diagram according to a sixth exemplary embodiment of the invention.

FIG. 6 is a circuit block diagram of a high-frequency compound switch module according to the sixth exemplary embodiment.

Description will be skipped of any parts of the structure in FIG. 6 that are analogous to the first through the fifth exemplary embodiments.

The high-frequency compound switch module comprises diplexer 32 connected to antenna terminal 1 for branching and combining signals of a first communication system as well as signals of a second and third communication system, SPDT switch 33 for switching between transmission and reception modes of the first communication system, and SP3T (single-pole triple-throw type) switch 34 for switching between transmission and reception modes of the third communication system and also for turning on/off the second communication system. This sixth exemplary embodiment constitutes a communication device adoptable for three communication systems.

In FIG. 6, band pass filters 11 and 24 comprise surface acoustic wave ("SAW") filters, and branching filter 12 employs SAW filters 13 and 14 for both of a transmission side and a reception side. It shows an example which uses third phase shift line 15 for impedance matching to achieve the function of branching and combining the transmission and reception signals of the second communication system.

SPDT switch 33 and SP3T switch 34 are controlled individually by a voltage or the like applied to control terminal 6, for a selection between transmission and reception modes in the first communication system, and between transmission and reception modes in the third communication system, in a manner to make connection of antenna terminal 1 to any of transmission terminal 2, transmission terminal 20, reception terminal 3 and reception terminal 21, after the signals are either branched or combined by branching filter 12.

SPDT switch 33 has first phase shift line 8 and SAW filter 11 connected to one side leading to reception terminal 3, and SP3T switch 34 has branching filter 12 for branching and combining transmission and reception signals of the second communication system connected to one of connection terminals. Branching filter 12 is then connected to transmission terminal 4 and reception terminal 5 as the respective external terminals.

Thus, the sixth exemplary embodiment can be applied to a communication system, which uses TDMA method as the first and third communication systems, and CDMA or FDMA as the second communication system.

In consideration of frequency allocations for any of the communication systems, a transmission frequency band and a reception frequency band are set relatively close to each other in general, with a difference of approximately 5% between their center frequencies. In the communication system discussed in this sixth exemplary embodiment, however, separation of frequencies is quite large between different systems as compared to the above, since individual systems are served in the widely spaced frequency bands.

Therefore, SAW filter 11 of the first communication system in the sixth exemplary embodiment has a passing characteristic with an attenuation band lying in a region of the transmission and reception frequencies of the second communication system. It thus shows a small value in real part (i.e. resistive component) of input impedance at these frequencies, which can be plotted in a region near a circle of real part=0 in the Smith chart, and a reflection coefficient close to magnitude 1 in absolute value.

On the other hand, branching filter 12 also has a passing characteristic with an attenuation band lying in a region of the transmission and reception frequencies of the first communication system, so that it shows a small value in real part (i.e. resistive component) of input impedance as measured from the side nearer to antenna terminal 1, which can be plotted in a region near the circle of real part=0 in the Smith chart, and a reflection coefficient close to magnitude 1 in absolute value (approx. 0.8 or greater).

The present invention is devised in light of the above respects, that the module is constructed by connecting first phase shift line 8 in a manner to provide a sufficiently large (open-circuit) impedance in the frequencies of the second communication system when observed from antenna terminal 1 toward reception terminal 3 through first phase shift line 8, and second phase shift line 9 in a manner to provide a sufficiently large (open-circuit) impedance in the frequencies of the first communication system when observed from antenna terminal 1 toward transmission terminal 4 and reception terminal 5 through diplexer 32, SP3T switch 34 and second phase shift line 9, under the condition that SPDT switch 33 is set to reception terminal 3 side and SP3T switch 34 is set to transmission terminal 4 and reception terminal 5 side of the second communication system in FIG. 6, thereby making it operable in the combination of the two different first and second communication systems.

In other words, adoption of the above structure makes it possible to receive a pilot signal transmitted from a base station of the first communication system and to control the communication device appropriately even when communication is being made with the second communication system, since a required control signal can be input to control terminal 6 to control SPDT switch 33 and SP3T switch 34 in a manner to make a connection from antenna terminal 1 to reception terminal 3 simultaneously for the signal received in the first communication system even in the midst of communication with the second communication system.

The sixth exemplary embodiment can be applied to a compound terminal that uses a combination of, for instance, GSM 900 (transmission frequency of the terminal in a range of 880 to 915 MHz, and receiving frequency in a range of 925 to 960 MHz) as the first communication system, W-CDMA (transmission frequency in a range of 1,920 to 1,980 MHz, and receiving frequency in a range of 2,110 to 2,170 MHz) as the second communication system, and DCS (transmission frequency in a range of 1,710 to 1,785 MHz, and receiving frequency in a range of 1,805 to 1,880 MHz) as the third communication system. In the communication system of this application, although the communication frequencies are comparatively close to each other especially between the second communication system and the third communication system, use of SP3T switch 34 can achieve separation of the signals easily without increasing the transmission loss.

In the above discussed first through sixth exemplary embodiments, the SPDT, SP3T, SP4T and SP5T type switches may be composed of FET switches made by GaAs process and the like and PIN diode switches.

In addition, the BPF's connected to the reception terminals need not be limited only to the SAW filters as discussed above, but other types of BPF's such as those made of dielectric resonator can also provide the like advantage.

Moreover, although the branching filter in the second communication system was described above as a structure having SAW filters, it may be composed of a combination of one filter using a multilayer structure of dielectric material for any of transmission and reception filters and an SAW filter for the other one, a kind of branching filter composed of a multilayer structure of dielectric material for both the transmission and reception filters, another kind of branching filter composed of filters using coaxial resonator, and the like.

Furthermore, although the structures described in the above first through sixth exemplary embodiments are provided with the low pass filters, they need not be included in the structure of this invention if a circuit for filtering out high harmonic spurious components is provided originally in the transmission circuit.

Figure 7A:
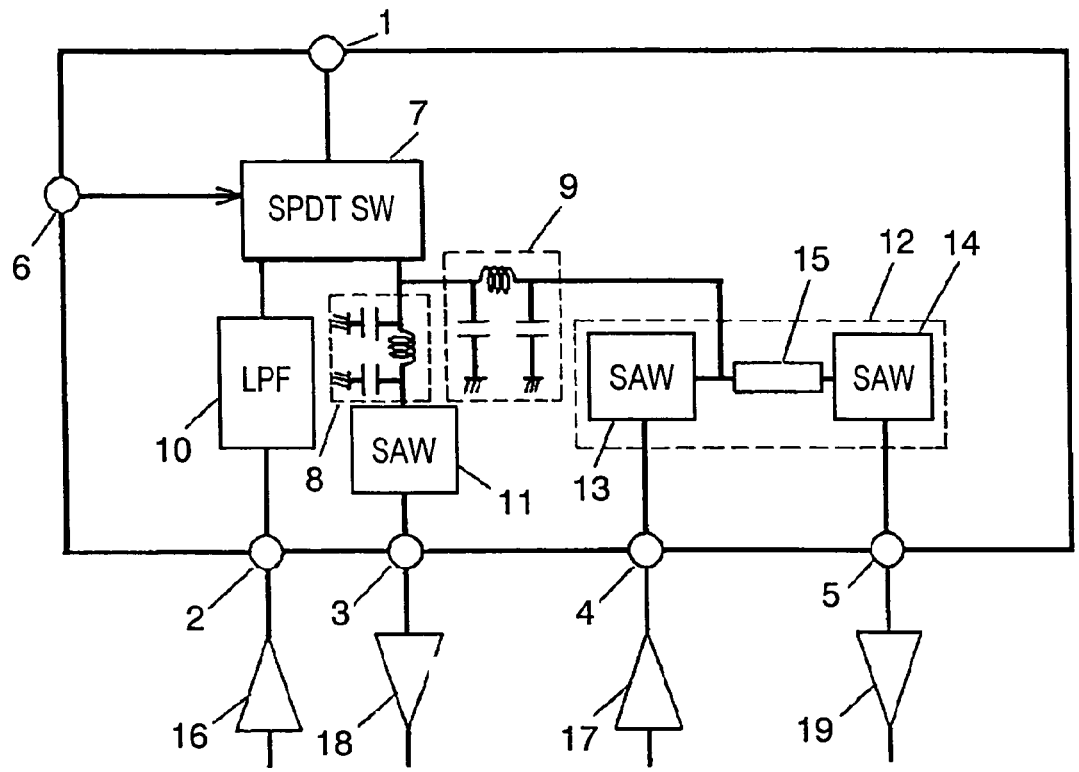
FIG. 7 represents block diagrams showing structural examples of phase shift lines useful for this invention.
Figure 7B:
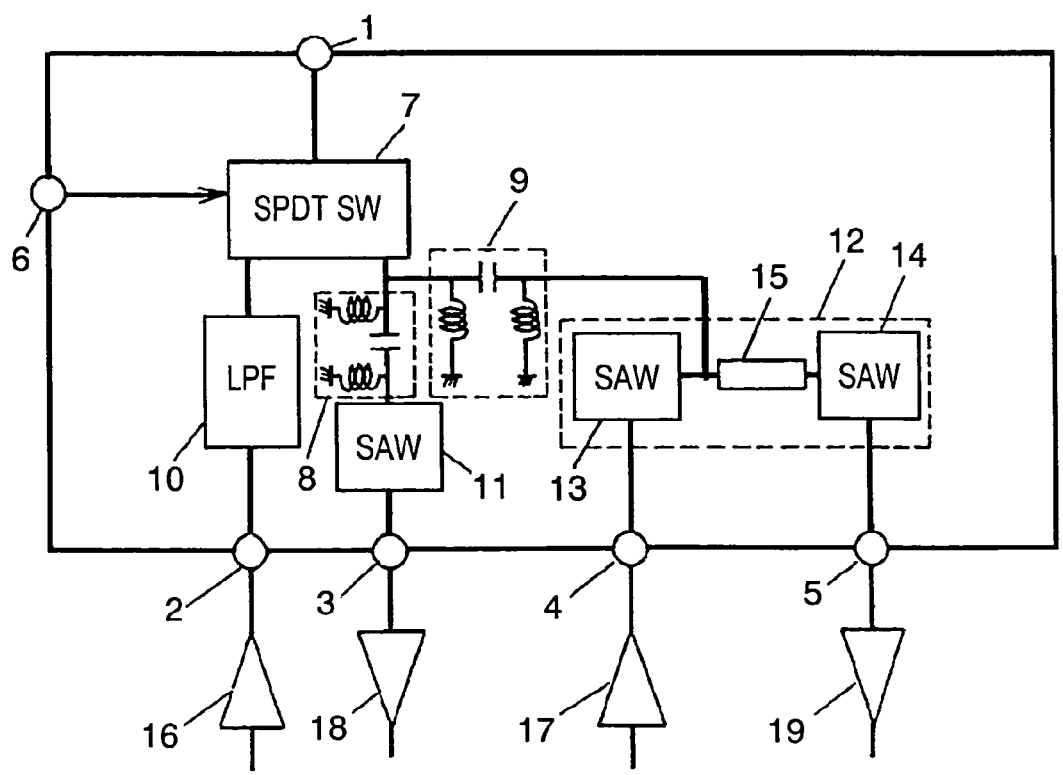

The first to the third phase shift lines shown above in the first through the sixth exemplary embodiments can be configured of any of strip lines, micro-strip lines, coplanar lines, and the similar type of transmission lines. Besides, the phase shift lines can also be configured of a $\pi$-type lumped constant circuit as shown in FIG. 7.

Figure 8:
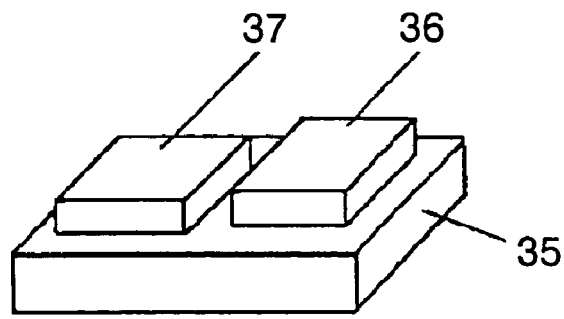
FIG. 8 is a perspective view of a high-frequency compound switch module according to another exemplary embodiment of this invention.
Figure 9A:
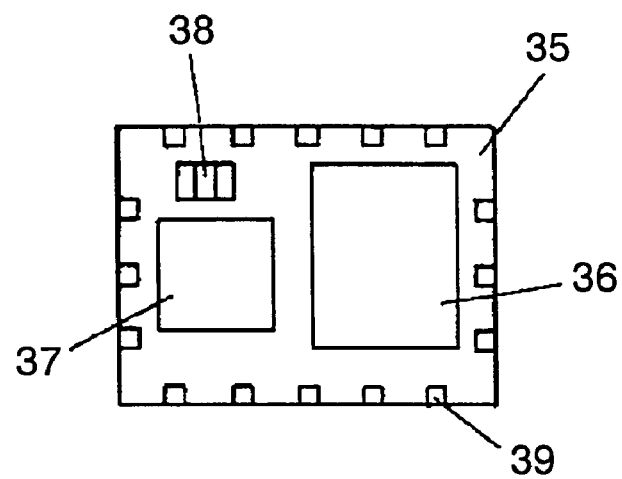
FIG. 9 represents schematic illustrations showing structure of a high-frequency compound switch module according to another exemplary embodiment of this invention.
Figure 9B:
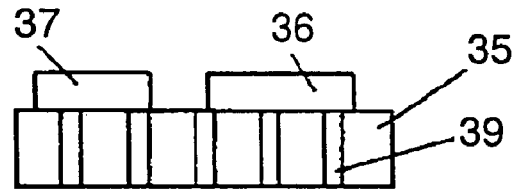
Figure 9C:
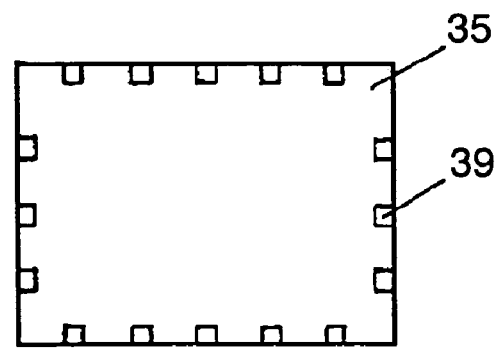

In any of the circuit structures described in the first through the sixth exemplary embodiments, the switches may be configured of monolithic IC, the filters may be composed using SAW filters, and most of the remaining circuits may be formed using an electrode pattern within a multilayer structure of dielectric material, as shown in FIG. 8 and FIG. 9, wherein SAW filter 36, switch IC 37 and chip component 38 are mounted on multilayer substrate 35 having input/output electrodes formed of side electrodes 39 or grid alley electrodes, thereby realizing the high-frequency compound switch module extremely compact.

Adoption of the above structure can provide the high-frequency compound switch module, which is easy to manufacture, very compact and high performance, since it uses the branching filter comprised of small SAW filters having a low loss in the passing band and a high attenuation over the frequencies outside the passing band, and the multilayer filter having an affinity to the peripheral circuits.

Figure 10A:
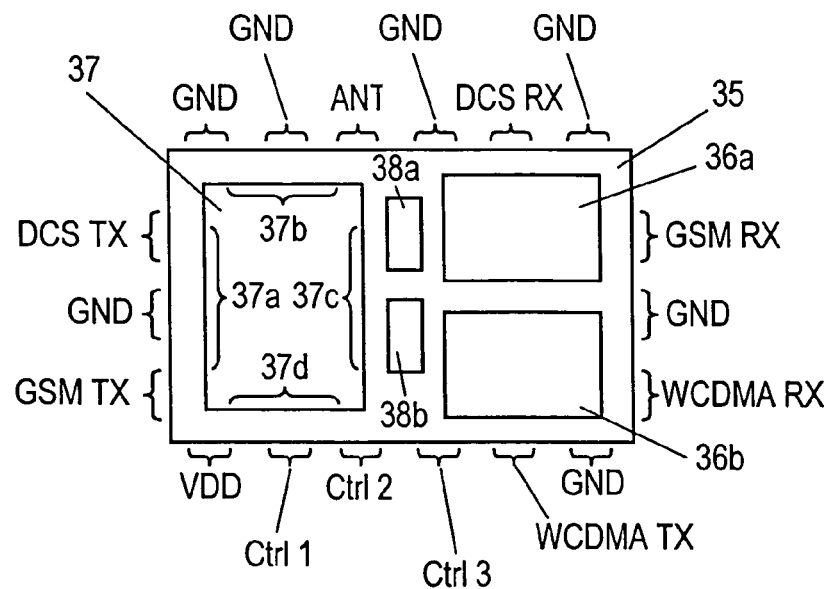
FIG. 10 represents schematic illustrations showing structure of another high-frequency compound switch module according to another exemplary embodiments of this invention.
Figure 10B:
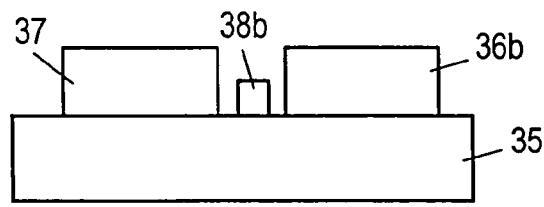
Figure 10C:
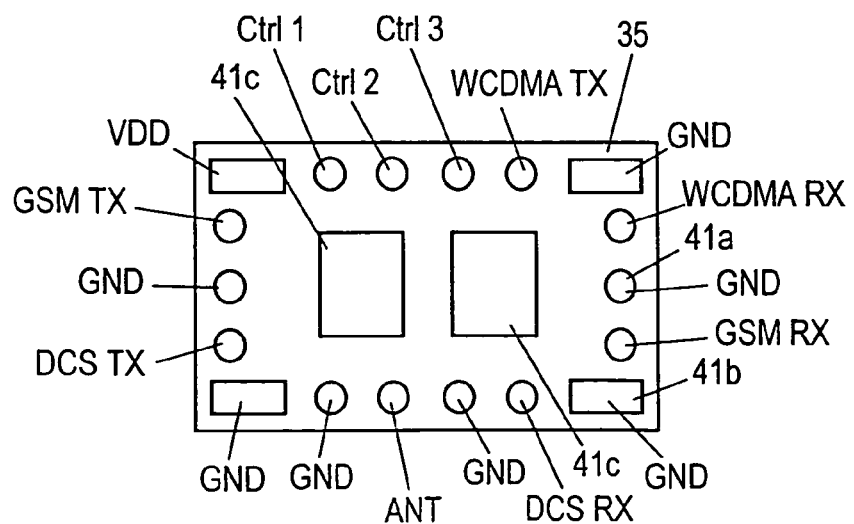
Figure 11:
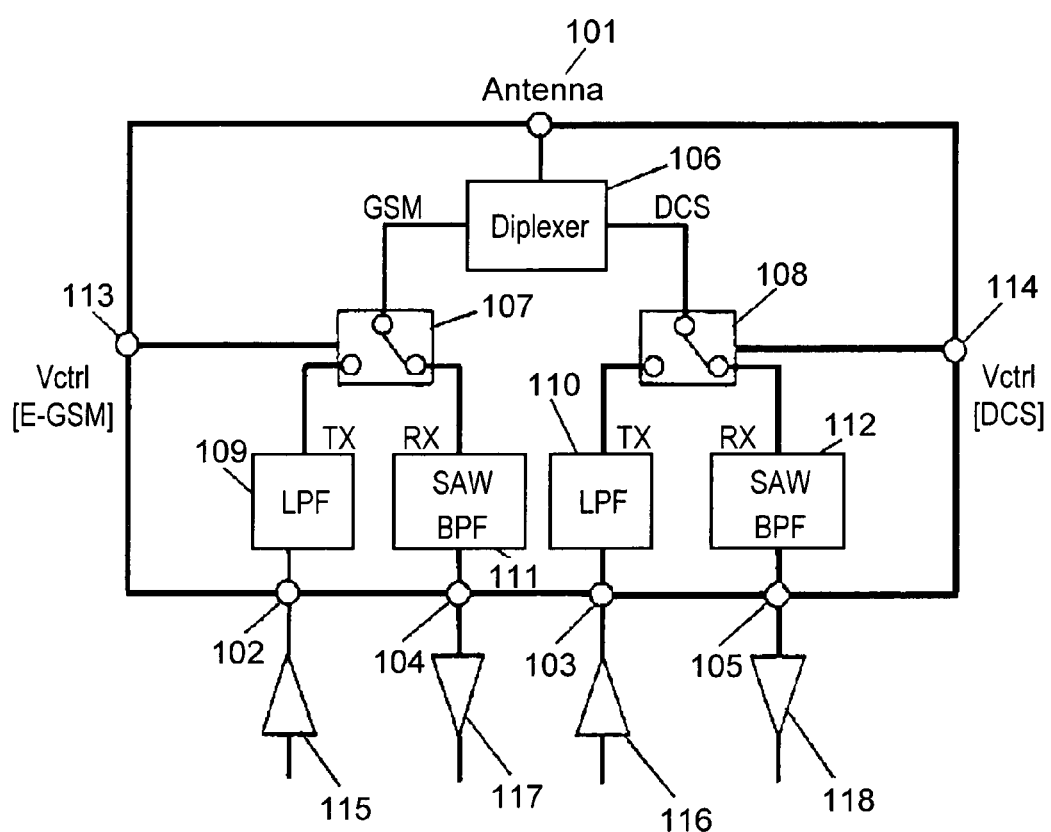
FIG. 11 is a block diagram representing a conventional circuit.

In addition, the module may be composed with terminals arranged as shown in FIG. 10, wherein antenna (ANT) terminal is located on an upper surface, and transmission side (GSM, DCS, W-CDMA-Tx) terminals and reception side (GSM, DCS, W-CDMA-Rx) terminals are centralized separately on the left to lower side area, and on the right to upper side area with respect to the antenna terminal, as viewed from top of the module. Accordingly, transmission circuits and reception circuits can be disposed to the left side and the right side respectively in this case, when they are connected to the module. Since an arrangement such as this example can avoid likelihood of performance degradation due to interaction between the transmission circuits and the reception circuits constructed on a motherboard (not shown), it provides the wireless terminal with superior performance.

It is important that switch IC 37 comprising the module has a proper pin layout in order to achieve the advantage discussed above. This is evident from the fact that connections can be made very easily among terminals of switch IC 37, circuits such as LPF's composed in multilayer substrate 35, and SAW filters 36*a* and 36*b*, when switch IC 37 has the pin layout as shown in FIG. 10, in which transmission side ports are located around side 37*a,* an antenna port at side 37*b,* reception side ports around side 37*c,* and control terminal ports around side 37*d.*

Thus, it has been made clear that pin layout of switch IC 37 is of great importance to the module shown in FIG. 10, which does not exhibit degradation in performance, is compact in size, and contributes to reliable operation of the transmission and reception circuits on the motherboard.

Moreover, it is extremely desirable for the module to have an electrode pattern as shown in FIG. 10 in order to further enhance the performance. That is, it is the first essential that all electrodes carrying high-frequency signals shall be made smaller in size as compared to electrodes of the other purposes. The reason of this is to prevent influence of stray capacity. As the second essential, all electrodes located in the corners are to be enlarged as much as the space permits. This is for an improvement of physical strength of the module after mounted. The third essential is to dispose additional number of dummy electrodes for the same purpose. The dummy electrodes can decentralize a stress, to improve the physical strength.

In view of the above, the present invention is to provide the electrode structure and the terminal arrangement shown in FIG. 10. In other words, electrode 41*b* located in the corner is formed larger in size than the terminals used for carrying the high-frequency signals ,by using it as an electrode for GND, or VDD (i.e. power supply for switch IC 37), or any of Ctrl-1 through Ctrl-3 (i.e. control terminal of switch IC 37). There are also dummy electrodes (which may be connected to grounding GND) provided additionally in a center space.

These electrodes may be used as LGA electrodes to make this structure contributable to even further improvement for ease of mounting and reliability in strength of the terminals. Because of the above structure, provided here is the device which is extremely superior in mechanical reliability and high-frequency characteristics.

In addition, this device may be covered with a metal cap (not shown) or coated with resin or the like material (not shown) to form a smooth top surface, thereby improving convenience of use when handled by a mounting machine equipped with suction device.

The invention disclosed here is the high-frequency compound switch module featuring the structure comprising SAW filters that use bulk wave for both filters in the transmission and the reception lines.

The above structure can provide the high-frequency compound switch module of high performance with even smaller size because it employs the branching filter comprising the small SAW filters using bulk wave, which have low loss in the passing band and high magnitude of attenuation over the, outside frequencies.

Moreover, this invention covers the high-frequency compound switch module featuring the structure comprising the first and second phase shift lines which include any of $\pi$-type or T-type network having a line-to-ground capacitor and a series inductor, and $\pi$-type or T-type network having a line-to-ground inductor and a series capacitor.

The above structure can realizes the phase shift lines of low insertion losses with small deviation, and thereby it provides the high-frequency compound switch module, which is easy to manufacture, small in size and high performance.

Furthermore, this invention also covers the high-frequency compound switch module featuring the structure of circuit comprising any of an electrode pattern formed above a grounding pattern with a spacing of dielectric material and another electrode pattern formed next to a grounding pattern with a spacing of dielectric material therebetween.

The above structure can realizes the phase shift lines of low insertion losses with small deviation, and thereby it provides the high-frequency compound switch module, which is easy to manufacture, small in size and high performance.

This invention also covers the high-frequency compound switch module featuring the structure wherein at least the first and the second phase shift lines in the circuit are formed with an electrode pattern inside the multilayer structure of dielectric material.

The above structure makes possible to use LTCC (i.e. low temperature co-fired ceramics) as the dielectric base material in combination with the electrode pattern of silver or copper, to compose the circuit of low loss in the high-frequency bands. Furthermore, since the circuit can be composed three-dimensionally into the multilayer substrate, the high-frequency compound switch module can be made small in size and high performance.

This invention also covers the high-frequency compound switch module featuring the structure wherein the switch unit and the filters are mounted on the multilayer substrate.

The above structure comprises the major circuit formed inside the multilayer substrate, and that the filters and the switch unit not feasible to build into the multilayer substrate are mounted on the multilayer substrate. Since this structure makes use of the multilayer substrate as a substrate to complete electrical connections of the filters, switch unit and the other peripheral circuits, it can provide the high-frequency compound switch module easy to manufacture, small in size and high performance.

Moreover, this invention is the high-frequency compound switch module adaptable for a number of communication systems, wherein the first, the third and the fourth communication systems are adapted to Time Division Multiple Access service, and the second communication system is adapted to one of Code Division Multiple Access and Frequency Division Multiple Access services.

The above structure has the switch unit for switching between transmission and reception modes for the communication systems of Time Division Multiple Access service, and the filter for branching and combining transmission and reception signals for the communication system of Code Division Multiple Access and Frequency Division Multiple Access services. The invention can thus provide the antenna diplexer of small size and high performance, yet adaptable to the multiple number of communication systems that has been hitherto considered difficult to attain.

Furthermore, this invention covers a communication terminal featuring the above high-frequency compound switch module connected with an antenna, a transmission circuit, and a reception circuit.

Adoption of the above structure provides the communication terminal with capability of using a multiple number of communication systems. In addition, since the high-frequency compound switch module has a small loss and small size, it can reduce amount of electric current during transmission and prevent a reception signal from being decreased, thereby providing the communication terminal with a prolonged operational time for telephone communication and high receiving sensitivity beside the small size.

As has been obvious from the above, this invention can realize the high-frequency compound switch module of small size and high performance with capability of adapting to the plurality of different communication systems.

INDUSTRIAL APPLICABILITY

The present invention relates to a high-frequency compound switch module adaptable for a mobile communication device such as a handy phone and the like, and a communication terminal using the same. The invention also provides an antenna diplexer of small size, high performance, and adaptable to a number of different communication systems.

What is claimed is:

1. A high-frequency compound switch module adaptable for at least two different communication systems, including a first communication system and a second communication system,
   said first communication system comprising:
   a switch unit for switching connection of a signal from an antenna to any of a transmission circuit and a reception circuit of said first communication system based on a signal from a control terminal;
   a filter provided on the reception circuit side, for filtering out a first reception signal; and
   a first phase shift line provided between said filter and said switch unit, and
   said second communication system comprising:
   a second phase shift line provided between said switch unit and said first phase shift line; and
   a branching filter provided in series to said second phase shift line for branching a signal from said second phase shift line into a second transmission signal and a second reception signal,
   wherein
   said switch module is capable of performing at least a receiving process of said first communication system while performing transmission/reception with said second communication system.

2. A high-frequency compound switch module adaptable for at least three different communication systems, including a first communication system, a second communication system and a third communication system,
   said switch module having a switch unit for switching connection of a signal from an antenna to any of transmission circuits and reception circuits of said first and said third communication systems based on a signal from a control terminal,
   said first communication system comprising:
   a first filter provided on a first reception circuit side, for filtering out a first reception signal; and
   a first phase shift line provided between said first filter and said switch unit,
   said second communication system comprising:
   a second phase shift line provided between said switch unit and said first phase shift line; and
   a branching filter provided in series to said second phase shift line for branching a signal from said second phase shift line into a second transmission signal and a second reception signal, and
   said third communication system comprising:
   a terminal for connection of one end of said switch unit to a third transmission circuit; and
   a third filter for filtering out a third reception signal, wherein
said switch unit also switches a third transmission signal and a third reception signal, and
said switch module is capable of performing at least a receiving process of said first communication system while performing transmission/reception with said second communication system.

3. A high-frequency compound switch module adaptable for at least four different communication systems, including a first communication system, a second communication system, a third communication system and a fourth communication system,
   said switch module having a switch unit for switching connection of a signal from an antenna to any of transmission circuits and reception circuits of said first through said fourth communication systems based on a signal from a control terminal,
   said first communication system comprising:
   said switch unit for switching connection of the signal from said antenna to any of the transmission circuit and the reception circuit of said first communication system;
   a first filter provided on a reception circuit side for filtering out a first reception signal; and
   a first phase shift line provided between said first filter and said switch unit,
   said second communication system comprising:
   a second phase shift line provided between said switch unit and said first phase shift line; and
   a branching filter provided in series to said second phase shift line for branching a signal from said second phase shift line into a second transmission signal and a second reception signal,
   said third communication system comprising:
   a terminal for connection of one end of said switch unit to a third transmission circuit; and
   a third filter for filtering out a third reception signal, and
   said fourth communication system comprising:
   a terminal for connection to said third transmission circuit; and
   a fourth filter for filtering out a fourth reception signal,
   wherein
   said switch module is capable of performing at least a receiving process of said first communication system while performing transmission/reception with said second communication system.

4. A high-frequency compound switch module adaptable for at least two different communication systems, including a first communication system and a second communication system,
   said switch module having a diplexer for branching a signal from an antenna and also combining transmission signals and reception signals of said first communication system and said second communication system,
   said first communication system comprising a switch unit for switching connection of a signal from said diplexer to one of a transmission circuit and a reception circuit of said first communication system based on a signal from a control terminal, and
   said second communication system comprising a branching filter for branching another signal from said diplexer into a second transmission signal and a second reception signal,
   wherein
   said switch module is capable of performing at least a receiving process of said first communication system while performing transmission/reception with said second communication system.

5. A high-frequency compound switch module adaptable for at least three different communication systems, including a first communication system, a second communication system and a third communication systems, said switch module having:
   a first switch unit for switching connection of a signal from an antenna to any of transmission circuits and reception circuits of said first and said third communication systems based on a signal from a control terminal; and
   a diplexer connected to said first switch unit for combining and branching transmission signals and reception signals of said first communication system and said second communication system,
   said first communication system comprising a second switch unit for switching connection of a signal from said diplexer to one of a transmission circuit and a reception circuit of said first communication system based on a signal from the control terminal,
   said second communication system comprising a branching filter for branching another signal from said diplexer into a second transmission signal and a second reception signal, and
   said third communication system comprising:
   a terminal for connection of one end of said first switch unit to a third transmission circuit; and
   another terminal for connection of another end of said first switch unit to a third reception circuit,
   wherein
   said first switch unit also switches a third transmission signal and a third reception signal, and
   said switch module is capable of performing at least a receiving process of said first communication system while performing transmission/reception with said second communication system.

6. A high-frequency compound switch module adaptable for at least four different communication systems, including a first communication system, a second communication system, a third communication system and a fourth communication system, said switch module having:
   a first switch unit for switching connection of a signal from an antenna to any of transmission circuits and reception circuits of said first and said fourth communication systems based on a signal from a control terminal; and
   a diplexer connected to said first switch unit for combining and branching transmission signals and reception signals of said first communication system and said second communication system,
   said first communication system comprising a second switch unit for switching connection of a signal from said diplexer to one of a transmission circuit and a reception circuit of said first communication system based on a signal from the control terminal,
   said second communication system comprising a branching filter for branching another signal from said diplexer into a second transmission signal and a second reception signal,
   said third communication system comprising:
   a terminal for connection of one end of said first switch unit to a third transmission circuit; and
   another terminal for connection of another end of said first switch unit to a third reception circuit, and said fourth communication system comprising:
a terminal for connection of still another end of said first switch unit to a fourth transmission circuit; and
another terminal for connection of yet another end of said first switch unit to a fourth reception circuit,
wherein
said first switch unit also switches any of third and fourth transmission signals and third and fourth reception signals, and
said switch module is capable of performing at least a receiving process of said first communication system while performing transmission/reception with said second communication system.

7. A high-frequency compound switch module adaptable for at least three different communication systems, including a first communication system, a second communication system and a third communication system,
said switch module having a first switch unit for switching connection of a signal from an antenna to any of transmission circuits and reception circuits of said first and said third communication systems based on a signal from a control terminal,
said first communication system comprising:
said first switch unit for also switching connection of a signal from the antenna to any of the transmission circuit and the reception circuit of said first communication system;
a first filter provided on the reception circuit side, for filtering out a first reception signal; and
a first phase shift line provided between said first filter and said first switch unit,
said third communication system comprising:
a terminal for connection of one end of said first switch unit to a third transmission circuit; and
a third filter for filtering out a third reception signal, and
said second communication system comprising:
a second switch unit connected between said first switch unit and said antenna, for switching the signal from said antenna to any of a transmission circuit and a reception circuit of said second communication system based on a signal from the control terminal;
a second phase shift line connected in series to said second switch unit; and
a second branching filter connected in series to said second phase shift line for branching a second transmission signal and a second reception signal,
wherein
said switch module is capable of performing at least a receiving process of said first communication system while performing transmission/reception with said second communication system.

8. A high-frequency compound switch module adaptable for at least four different communication systems, including a first communication system, a second communication system, a third communication system and a fourth communication system,
said switch module having a first switch unit for switching connection of a signal from an antenna to any of transmission circuits and reception circuits of said first, said third and said fourth communication systems based on a signal from a control terminal,
said first communication system comprising:
said first switch unit for switching connection of the signal from the antenna to any of the transmission circuit and the reception circuit of said first communication system;
a first filter provided on a reception circuit side for filtering out a first reception signal; and
a first phase shift line provided between said first filter and said first switch unit,
said third communication system comprising:
a terminal for connection of one end of said first switch unit to a third transmission circuit; and
a third filter for filtering out a third reception signal,
said fourth communication system comprising:
switching between a fourth transmission signal and a fourth reception signal with said first switch unit;
a terminal for connection of another end of said first switch unit to a fourth transmission circuit; and
a fourth filter for filtering out the fourth reception signal, and
said second communication system comprising:
a second switch unit connected between said first switch unit and said antenna, for switching the signal from said antenna to any of a transmission circuit and a reception circuit of said second communication system based on a signal from the control terminal;
a second phase shift line connected in series to said second switch unit; and
a second branching filter connected in series to said second phase shift line for branching a second transmission signal and a second reception signal,
wherein
said switch module is capable of performing at least a receiving process of said first communication system while performing transmission/reception with said second communication system.

9. A high-frequency compound switch module adaptable for at least three different communication systems, including a first communication system, a second communication system and a third communication system,
said switch module having a diplexer for splitting a signal from an antenna,
said first communication system comprising:
a first switch unit for switching connection of a signal from said diplexer to one of a transmission circuit and a reception circuit of said first communication system based on a signal from a control terminal;
a first filter provided on the reception circuit side, for filtering out a first reception signal; and
a first phase shift line provided between said first filter and said first switch unit,
said third communication system comprising:
a second switch unit for switching connection of another signal from said diplexer to one of a transmission circuit and a reception circuit of said third communication system based on a signal from the control terminal;
a second filter provided on the reception circuit side, for filtering out a third reception signal; and
a transmission terminal connected to a third transmission circuit, and
said second communication system comprising:
said second switch unit for switching the signal from said antenna to any of a transmission circuit and a reception circuit of said second communication system based on a signal from the control terminal;
a second phase shift line connected in series to said second switch unit; and
a second branching filter connected in series to said second phase shift line for branching a second transmission signal and a second reception signal, wherein
said switch module is capable of performing at least a receiving process of said first communication system while performing transmission/reception with said second communication system.

10. The high-frequency compound switch module according to one of claim 1 through claim 3, wherein said switch module has:
an impedance value equivalent to an open circuit in a frequency of said first communication system when measured at a point of connection between said first phase shift line and said second phase shift line toward transmission and reception circuits of said second communication system; and
another impedance value equivalent to an open circuit in a frequency of said second communication system when measured at the same point of connection toward the transmission and the reception circuits of said first communication system.

11. The high-frequency compound switch module according to one of claim 4 and claim 5, wherein said switch module has:
an impedance value equivalent to an open circuit in a frequency of said first communication system when measured from an antenna terminal toward transmission and reception circuits of said second communication system; and
another impedance value equivalent to an open circuit in a frequency of said second communication system when measured from the antenna terminal toward the transmission and the reception circuits of said first communication system.

12. The high-frequency compound switch module according to one of claim 1 through claim 9, further comprising a low pass filter connected to each of circuits between said switch unit and transmission terminals of said communication systems.

13. The high-frequency compound switch module according to one of claim 1 through claim 9, wherein said branching filter in said second communication system comprises SAW filters disposed to both transmission and reception lines, and a third phase shift line for impedance matching connected between said SAW filters in said transmission and reception lines.

14. The high-frequency compound switch module according to one of claim 1 through claim 9, wherein said branching filter in said second communication system comprises a filter composed of a multilayer structure of dielectric material disposed to one of transmission and reception lines, and an SAW filter disposed to the other of said lines.

15. The high-frequency compound switch module according to one of claim 1 through claim 9, wherein said branching filter in said second communication system comprises filters composed of multilayer structure of dielectric material disposed to both transmission and reception lines.

16. The high-frequency compound switch module according to one of claim 1 through claim 9, wherein said branching filter in said second communication system comprises acoustic wave filters using bulk wave, disposed to both transmission and reception lines.

17. The high-frequency compound switch module according to one of claim 1 through claim 3, wherein said first phase shift line and said second phase shift line comprise any of a π-type network and T-type network having a line-to-ground capacitor and a series inductor, and a π-type network and T-type network having a line-to-ground inductor and a series capacitor.

18. The high-frequency compound switch module according to one of claim 1 through claim 9, wherein a circuit structure of said switch module comprises any of an electrode pattern formed on top of a dielectric material layer provided above a grounding pattern and another electrode pattern formed on a grounding pattern with a spacing of dielectric material therebetween.

19. The high-frequency compound switch module according to one of claim 1 through claim 3, wherein at least said first phase shift line and said second phase shift line constituting a circuit of said switch module comprise an electrode pattern formed inside a multilayer structure of dielectric material.

20. The high-frequency compound switch module according to one of claim 1 through claim 9, wherein said switch unit and said filter are mounted on a multilayer substrate.

21. The high-frequency compound switch module according to one of claims 2, 3 and 5, wherein at least one of said first communication system, or said third communication system operate for Time Division Multiple Access service, and said second communication system operates for any of Code Division Multiple Access and Frequency Division Multiple Access services.

22. The high-frequency compound switch module according to one of claims 3 and 6, wherein at least one of said first communication system, said third communication system or said fourth communication system operate for Time Division Multiple Access service, and said second communication system operates for any of Code Division Multiple Access and Frequency Division Multiple Access services.

23. A communication terminal comprising an antenna, a transmission circuit and a reception circuit connected to a high-frequency compound switch module recited in one of claim 1 through claim 9.

24. A high-frequency compound switch module adaptable for at least two different communication systems, including a first communication system and a second communication system,
said first communication system comprising:
a switch unit for switching connection of a signal from an antenna to any of a transmission circuit and a reception circuit of said first communication system based on a signal from a control terminal;
said second communication system comprising:
a second phase shift line provided between said switch unit and a first phase shift line;
wherein
said switch module is capable of performing at least a receiving process of said first communication system while performing transmission/reception with said second communication system,
said high-frequency compound switch module further comprising a diplexer connected between said switch unit and a reception terminal of said first communication system and transmission and reception terminals of said second communication system, for combining and branching the reception signal of said first communication system and the transmission signal and the reception signal of said second communication system.

25. A high-frequency compound switch module adaptable for at least three different communication systems, including a first communication system, a second communication system and a third communication system,
said first communication system comprising:
said switch module having a switch unit for switching connection of a signal from an antenna to any of transmission circuits and reception circuits of said first and said third communication systems based on a signal from a control terminal, said second communication system comprising:

a second phase shift line provided between said switch unit and a first phase shift line; and said third communication system comprising:

a terminal for connection of one end of said switch unit to a third transmission circuit; and a third filter for filtering out a third reception signal, wherein said switch unit also switches a third transmission signal and a third reception signal, and said switch module is capable of performing at least a receiving process of said first communication system while performing transmission/reception with said second communication system, said high-frequency compound switch module further comprising a diplexer connected between said switch unit and a reception terminal of said first communication system and transmission and reception terminals of said second communication system, for combining and branching the reception signal of said first communication system and the transmission signal and the reception signal of said second communication system.

26. A high-frequency compound switch module adaptable for at least four different communication systems, including a first communication system, a second communication system, a third communication system and a fourth communication system, said switch module having a switch unit for switching connection of a signal from an antenna to any of transmission circuits and reception circuits of said first through said fourth communication systems based on a signal from a control terminal, said first communication system comprising:

said switch unit for switching connection of the signal from said antenna to any of the transmission circuit and the reception circuit of said first communication system;

said second communication system comprising:

a second phase shift line provided between said switch unit and a first phase shift line; and said third communication system comprising:

a terminal for connection of one end of said switch unit to a third transmission circuit; and a third filter for filtering out a third reception signal, and said fourth communication system comprising:

a terminal for connection to said third transmission circuit; and a fourth filter for filtering out a fourth reception signal, wherein said switch module is capable of performing at least a receiving process of said first communication system while performing transmission/reception with said second communication system, said high-frequency compound switch module further comprising a diplexer connected between said switch unit and a reception terminal of said first communication system and transmission and reception terminals of said second communication system, for combining and branching the reception signal of said first communication system and the transmission signal and the reception signal of said second communication system.

* * * * *